(12) United States Patent
Mankekar et al.

(10) Patent No.: US 12,375,466 B2
(45) Date of Patent: Jul. 29, 2025

(54) INTEGRATED AUTHENTICATION AND AUTHORIZATION FOR CLOUD DATA LAKES

(71) Applicant: Cazena, Inc., Waltham, MA (US)

(72) Inventors: Durgesh Mankekar, Medford, MA (US); Justin Bradford, Minneapolis, MN (US); John Piekos, Westford, MA (US)

(73) Assignee: Cazena, Inc., Waltham, MA (US)

( * ) Notice: Subject to any disclaimer, the term of this patent is extended or adjusted under 35 U.S.C. 154(b) by 180 days.

(21) Appl. No.: 17/563,436

(22) Filed: Dec. 28, 2021

(65) Prior Publication Data

US 2022/0337578 A1  Oct. 20, 2022

Related U.S. Application Data

(60) Provisional application No. 63/132,072, filed on Dec. 30, 2020, provisional application No. 63/131,922, filed on Dec. 30, 2020.

(51) Int. Cl.
*H04L 9/40* (2022.01)

(52) U.S. Cl.
CPC ...... *H04L 63/0815* (2013.01); *H04L 63/0236* (2013.01)

(58) Field of Classification Search
CPC .......... H04L 63/0815; H04L 63/0236
See application file for complete search history.

(56) References Cited

U.S. PATENT DOCUMENTS

| | | | |
|---|---|---|---|
| 10,922,284 B1* | 2/2021 | Venkatasubramanian | H04L 63/0807 |
| 2014/0164944 A1* | 6/2014 | Sivakumar | G06F 16/9577 715/746 |
| 2014/0365549 A1* | 12/2014 | Jenkins | G06F 9/526 709/201 |
| 2016/0218991 A1 | 7/2016 | Sharabi et al. | |

(Continued)

FOREIGN PATENT DOCUMENTS

WO   2019040436 A1   2/2019

OTHER PUBLICATIONS

International Search Report and Written Opinion, PCT/US2021/065596, May 30, 2022.

*Primary Examiner* — William S Powers
(74) *Attorney, Agent, or Firm* — David H. Judson

(57) ABSTRACT

A method and SaaS-based computing platform implemented by a service provider provide for authentication and authorization services in association with the provisioning of a cloud data lake. According to the method, a data lake is provisioned across one or more cloud computing services, preferably within a private data cloud. The data lake comprises at least a first service and a second service, wherein the first and second services use different authentication mechanisms. An authentication framework including an identity and access manager (e.g., Keycloak provisioned to support both OpenLDAP and Kerberos) is configured to enable a permitted user to use a single identity to access the first and second services in the data lake. An authorization framework also is provisioned in association with the authentication framework. The authorization framework configured to apply authorization or data access rules to the single identity across the first and second services in the data lake.

14 Claims, 27 Drawing Sheets

(56) References Cited

U.S. PATENT DOCUMENTS

2017/0041296 A1* 2/2017 Ford .................. G06F 21/64
2018/0241813 A1   8/2018 Funk
2018/0302291 A1  10/2018 Srinivasan et al.
2019/0098737 A1*  3/2019 Nagesh ................ H04L 63/08
2020/0125530 A1   4/2020 Barth et al.
2020/0174966 A1*  6/2020 Szczepanik ......... G06F 16/13

* cited by examiner

INTEGRATED AUTHENTICATION AND AUTHORIZATION FOR CLOUD DATA LAKES

BACKGROUND

Technical Field

This disclosure relates generally to security services in a cloud computing environment.

Background of the Related Art

A data lake is a system or repository of data stored in its natural/raw format, typically a single store of data including raw copies of source data, as well as transformed data. used for tasks such as reporting, visualization, advanced analytics and machine learning. A data lake can include structured data from relational databases (rows and columns), semi-structured data (CSV, logs. XML. JSON), unstructured data (emails, documents. PDFs) and binary data (images, audio, video). A data lake can be established "on premises" (within an organization's data centers) or "in the cloud" (using cloud services from vendors such as Amazon®, Microsoft®, or Google®). Creating a data lake requires several tasks: acquire and deploy infrastructure, physical hardware, set up and configure compute, storage and networking, as well as big data compute engines, security and management tooling. This is a very time-consuming process, often taking a team six-to-nine (6-9) months to build a production-ready, fully-secure environment. Creating data lakes in a cloud computing environment eliminates the hurdle of buying physical hardware, but it still requires significant work sizing, configuring and deploying fully secure data lakes in a timely manner.

As cloud data lakes become pervasive in enabling data analytics solutions for businesses, it is imperative to keep these data lakes secure. A first key component of data lake security is authentication, namely, the notion of providing users with a single identity across multiple services. Today's cloud data lakes comprise multiple services ranging from Apache® Hadoop® services (like Apache Yarn™, Spark™, Hive™, Presto®), web user interfaces (like Hue, Jupyter-Hub®, Grafana®) and cloud-native services (like AWS Athena™, Glue™, SageMaker™, Redshift™ and S3™). All of these applications use different mechanisms to authenticate; these mechanisms vary from LDAP, MIT Kerberos™, locally-maintained users, users in corporate directories, or federated users using open standards like OpenID Connect or SAML 2.0, as well as cloud-provider identities like IAM users. Most customers also prefer to use their corporate identity providers (IDP) to extend their users' identities to the data lake.

Relatedly, another key component of data lake security is authorization, i.e., providing users granular access to the data lake resources while keeping the data lake safe from unauthorized access. As with authentication, the multiple services available in a data lake also use different authorization mechanisms to control access to data. Applications in the Hadoop ecosystem (such as Yarn, HDFS (Hadoop Distributed File System), Hive™, Kafka,® Knox™, and others) have used Apache Ranger™, an open-source authorization framework. On the other hand, cloud providers such as AWS provide a combination of IAM for resource-level access control, together with newer approaches like AWS Lake Formation for fine-grained data access to the data lake. As cloud data lakes become the central repository of all structured and unstructured data in a business, it becomes important to protect any PI (personally identifiable information) from such datasets before it can be loaded into analytical systems. Another important requirement is to provide detailed access logs that can be used in security audits to facilitate meeting regulatory and compliance requirements.

BRIEF SUMMARY

A method and SaaS-based computing platform implemented by a service provider provide for authentication and authorization services in association with the provisioning of a cloud data lake. According to the method, a data lake is provisioned across one or more cloud computing services, preferably within a private data cloud. The data lake comprises at least a first service and a second service, wherein the first and second services use different authentication mechanisms. An authentication framework including an identity and access manager (e.g., Keycloak® provisioned to support both OpenLDAP® and Kerberos) is configured to enable a permitted user to use a single identity to access the first and second services in the data lake. An authorization framework also is provisioned in association with the authentication framework. The authorization framework configured to apply authorization or data access rules to the single identity across the first and second services in the data lake.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
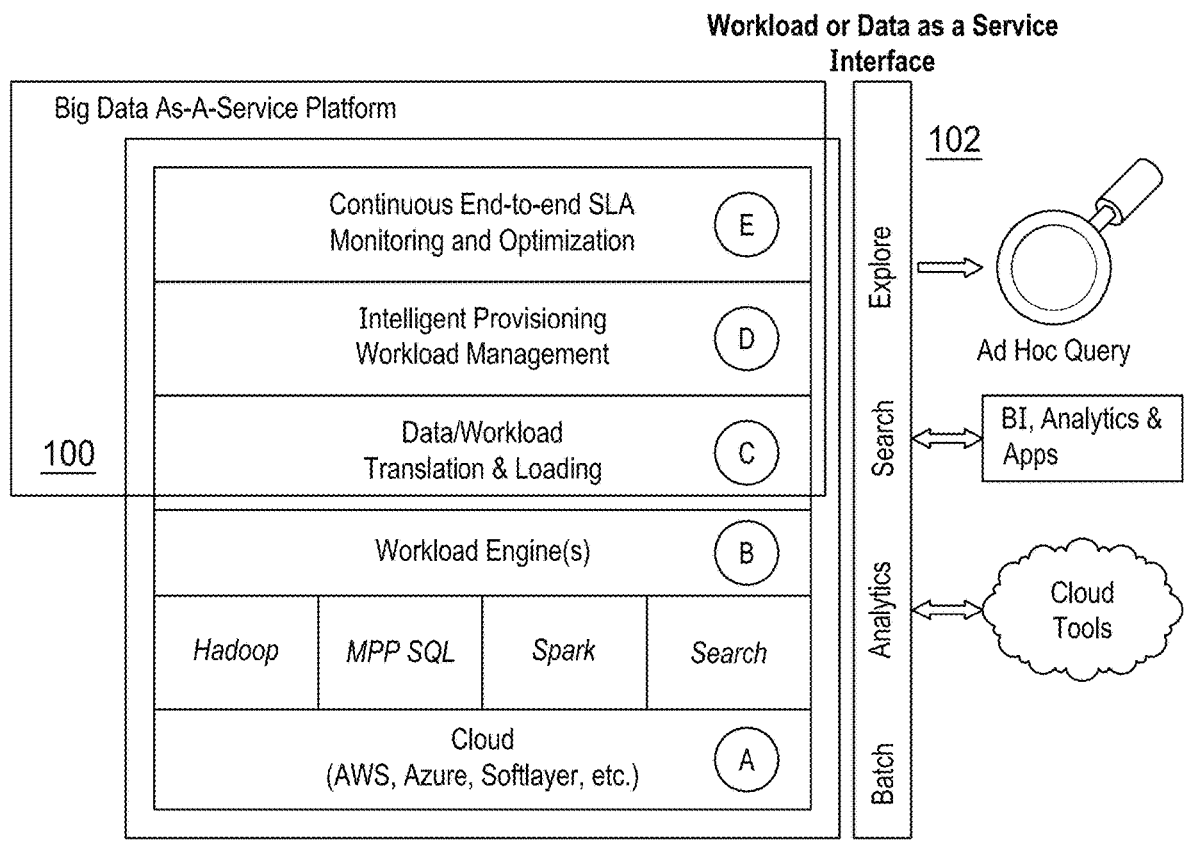
FIG. 1 depicts an exemplary block diagram of a known distributed data processing environment in which exemplary aspects of the illustrative embodiments may be implemented.

The techniques herein are implemented from a network-accessible platform, which platform operates in association with, on the one hand, an enterprise analytics data infrastructure, and, on the other hand, a cloud computing infrastructure. A "customer" or "user" of the platform typically is an enterprise that desires to execute an analytics application "workload" against a set of enterprise data. Typically, the enterprise data comprises one or more data sources, and the notion of "enterprise data" is not necessarily limited to data that is actually sourced from the enterprise. The service platform of this disclosure acts as an intermediary between the enterprise analytics data infrastructure (which, typically, is "on-premises") and the underlying cloud compute resources that are to be provisioned and utilized by the enterprise for executing the workload. Typically, a "workload" as used herein refers to the operations that are performed by the analytics applications with respect to the enterprise data. According to this disclosure, that "workload" gets executed in the "cloud," but in a seamless and efficient manner. In this way, both the enterprise data itself and the analytics operations on that data are off-loaded to the cloud, but in a manner that provides the enterprise customer with only the amount of "resources" needed for the workload, and in a reliable and cost-effective manner.

By way of background, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof. The services platform described may itself be part of the cloud compute infrastructure, or it may operate as a standalone service that executes in association with third party cloud compute services, such as Amazon® AWS, Microsoft® Azure, IBM® SoftLayer®, and others.

Typically, the enterprise analytics infrastructure is a standard analytic stack data flow comprising one or more data warehouses or data marts, ETL processes, workload engines (e.g., databases such as Hadoop, MPP SQL, Search or Spark), and analytics applications, such as business intelligence tools, advanced analytics tools, and the like. As is well known, a data warehouse, sometimes referred to an enterprise data warehouse (EDW), is a system used for reporting and data analysis. Data warehouses are central repositories of integrated data from one or more disparate sources. Typically, they store current and historical data. A data mart is a type of data warehouse that is focused on a single subject or functional area. Data marts usually draw data from only a few sources, such as internal operational systems, a central data warehouse, or external data. An extract-transform-load (ETL) process provides staging, data integration, and access layers. The staging layer stores raw data extracted from each of the disparate source data systems. The integration layer integrates the disparate data sets by transforming the data from the staging layer. The integrated data are then moved to the data warehouse database, where the data is arranged, typically into hierarchical groups. The access layer helps users retrieve data. The particular details of the enterprise data analytics layer are not a limitation of this disclosure, as the services platform is designed to operate with any type of components that may comprise the enterprise data analytics environment.

In particular, and as will be described, multiple enterprise customers use the services platform to offload data analytics workloads to "data clouds" that are intelligently provisioned and managed by the services platform. Each customer's workload may be executed in the cloud securely and privately, and in a manner that, for a given customer, meets a service level objective and cost.

By way of additional background, FIG. 1 illustrates how a services platform 100 functions as an intermediary between the enterprise and the cloud compute infrastructure. As seen in FIG. 1, layer A represents that underlying cloud compute resources on which the data analytics application commands are executed against one or more workload engines, which are represented as layer B. The compute cloud and the workload engines are not necessarily part of the services platform but they are accessible thereby. The services platform 100 typically comprises Layers C, D and E.

Layer D (Intelligent Provisioning/Workload Management) provides the basic resource provisioning of the underlying compute cloud infrastructure, which includes the "data warehouse environment" including storage, compute nodes, networking, as well as the specific workload engine (a database, for example, a Hadoop distribution with specific configuration), which often is available from the cloud provider. As used herein, a workload engine refers to a database or data processing engine, such as (without limitation) those based on SQL, Hadoop, NoSQL, and others. Preferably, provisioning is done based on static information provided by the enterprise, or based on a "profiler" that profiles a specific workload and derives "optimal" provisioning based on cost, utilization and SLA requirements for the unique characteristics of the workload. This type of optimal provisioning ensures adequate workload performance at the lowest cost cloud footprint. As will be described, the resource provisioning is instantiated from a simple user interface console using a small set of basic inputs.

In general, the provisioning layer optimally provisions resources in the cloud by matching workload resource requirements to resource bundling options available in the cloud. To this end, the layer includes a workload profiler that accepts historical workload information comprising, for example, a plurality of database log files, application log files, and query system views, along with actual and projected workloads. It uses this information to produce a description of the workload resource requirements. A provisioning optimizer accepts the profiled workload resource requirements, along with service level agreements and cost requirements, and descriptions of the resource bundling options available in the cloud, and calculates the optimal cloud provisioning. This optimal cloud provisioning typically is a subset of the available cloud compute resources, and it may include an identification of one or more workload engines (e.g., databases) that will store the data and against which a workload (a set of commands from an analytics application, a set of search queries, etc.) will be executed.

In one embodiment, the historical log files and databases comprise descriptions of specific database queries, such descriptions comprising an identifier and text of a database query, the time the query was submitted and the time it completed, an execution plan for the query comprising a number of database operations, the estimated and actual costs and resources required for each database operation in the execution plan. The historical log files and databases may also comprise aggregated information about queries submitted over a period of time, such aggregated information comprising the number and total amount of time and total resources used by all queries over the period of time, grouped by type of resource and by database operation. By way of example, this aggregated information may indicate the total number of sequential disk scan operations across all queries over a period of time, along with the total number of bytes scanned, and the total time required to do the scanning.

In one embodiment, the service level agreements comprise a plurality of performance specifications. A performance specification may indicate a scheduling requirement as the time at which a particular workload is to complete. A performance specification may indicate a latency requirement as a percentage of cases in which a workload is to complete within a given amount of time after it is submitted. A performance specification may indicate a throughput requirement as the number and type of workloads to be completed within a period of time. With each specification in the service level agreements, there is a cost associated with failure to satisfy the condition. These costs may be arbitrary functions of both the size and the duration of the failure.

In one embodiment, the resource bundling options available in the cloud are derived by accessing public APIs provided by commercial cloud vendors and stored in database tables, whose columns indicate a cloud vendor, a locale, a resource-bundling-name, and a description of the types and amounts of resources provided in the bundling option. Said resources comprise compute resources, memory resources, disk resources and network resources. Said compute resources comprise number of cores, cycle time (GHz) and operations per second, processor type and instruction set (such as GPU/CUDA or CPU/ix86 or FPU). Said memory resources comprise memory level (L1 cache, L2 cache, L3 cache, general memory), #bytes-per-level, time to move data from memory level to processing unit. Said disk resources include type (SSD, magnetic disk), capacity in byte, read seek time, write seek time, #bytes/sec for reads and writes, IOPS. Said network resources comprise network type, #bytes/sec.

In one embodiment, the optimal cloud provisioning comprises a list of available provisioning options, ordered from best to worst, where each option comprises a workload description, a cloud provider, cloud locale, a number and type of virtual computational nodes, and a number and type of storage options. The term "optimal" is not intended to be limiting. The workload description comprises any or all of the workloads. The cloud provider may be a commercial vendor or a private on-premises cloud. The cloud locale describes the geographical region in which the cloud is to be provisioned. The type of virtual computational is a specific bundling of computational resources; and a storage option is a specific bundling of storage capacity and performance. In an embodiment supporting elasticity, the provisioning options further comprise range information describing the minimum, maximum and average number of virtual computational nodes of given types, along with the standard deviation. Layer E (Continuous SLA Monitoring and Optimization) ensures that the cloud compute resources are optimized, for example, based on an actual delivery of an SLA and cost over a certain period of time. This layer includes functionality that computes the utilization and SLA for workloads, for example, over daily, weekly, monthly windows. Based on one or more rule-based triggers, the optimization layer can alert or create reports if there is persistent under-allocation or over-allocation of resources. When this happens, Layer E can allocate a specific "re-provisioning time window," where the system resources are dynamically altered. Alteration as used herein may refer to an increase or decrease in the number of nodes provisioned based on the observed rules, altering specific "type" of nodes to increase or decrease performance based on specific I/O, compute or memory characteristics, altering the specific location of the processing (regions) to reduce latency and contention, or shifting the workload to an alternative cloud provider (e.g., if there is a persistent issue tied to the current provider).

Layer C (Data Translation and Loading) ensures that the enterprise data is loaded in an optimal way into the right workload engine environment. The "loading" function typically is carried out by one or more "data movers" that are integrated into the enterprise environment or that work in conjunction therewith. In some cases, the enterprise data may need to go through translation (such as schema translation, conversion of keys, compression, and so forth) to the right environment. For example, moving data from SMP databases to MPP databases require steps in terms of schema mapping, sort and distribution keys. This layer takes care of the specific issues involved in moving data sources to targets (the workload engines themselves).

Access to the services platform 100 may be provided via a services interface 102 through which enterprise users may perform queries, execute workloads (typically search queries instituted from Business Intelligence tools, Advanced Analytics applications, etc.), and the like. The service interface 102 may be implemented as a manual CLI or GUI-based interface, an application programming interface (API), or some other such mechanism.

Figure 2:
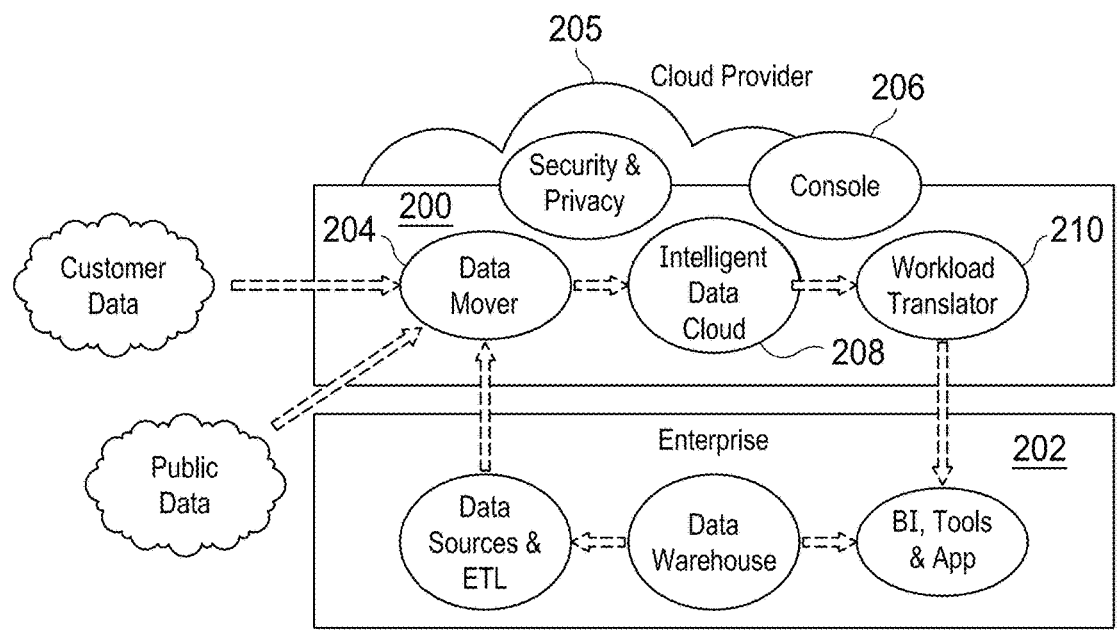
FIG. 2 illustrates how the services platform of this disclosure provides an overlay on an enterprise data analytics layer.

FIG. 2 illustrates the services platform 200 of FIG. 1 positioned as an "overlay" on the enterprise data analytics infrastructure 202. As noted, the enterprise analytic stack data flow includes the ETL, data warehousing, EDW, and BI/advanced analytic tools. The enterprise infrastructure also may comprise log and unstructured data aggregation, Hadoop processing, other analytic processing tools, and the like. Block 202 shows one specific cloud provider and its cloud offerings (such as compute nodes, storage nodes, and the like). The service platform, as noted, is architected to support multiple cloud providers, only one of which is shown in FIG. 2.

As noted, the service includes a number of functional modules. The data mover functionality 204 provides automated life-cycle management of the enterprise data that needs to be exported to the services platform. As will be described, this functionality provides a flexible data collection tool (or tool set) that aggregates structured and unstructured data from a number of different enterprise data sources including, without limitation, ETL servers, files, logs, or databases or data warehouses. Data is collected based on specific rules and filters so that only required subset of data is collected. Preferably, a data mover component can incorporate data from existing collection agents such as flume or fluentd, or via other log ingest mechanisms. The data mover functionality may be implemented in software, in hardware-based appliance, in specialized server machines, or the like. Aggregated data either is moved to the cloud directly, or it can be staged (e.g., on a staging server/appliance) and then scheduled for delivery at the most efficient and optimal times. Preferably, a data mover provides one or more transformations, such as data compression, and data encryption. In particular, preferably all data that is collected is compressed using a variety of techniques best suited to the type of data. Preferably, the data is encrypted with standard enterprise-class standards. Optionally, the service provides a full end-to-end encrypted tunnel for support of analytics on encrypted data. Preferably, the enterprise data is moved into the cloud (and, in particular, into the workload engine(s)) via a specialized delivery protocol that ensures reliability and high-performance of delivery. A particular data mover may also leverage third party mechanisms, such as AWS Direct Connect, or any other delivery protocol that the cloud providers offer to the enterprises. Generally, and as described, a particular data mover supports streaming, scheduled or one-time data movement. In a preferred embodiment, and as will be described, a data mover is built to layer on top of existing cloud provider offerings (such as AWS S3 and others) so that it provides seamless big data movement with a few clicks. A particular data mover is instantiated and orchestrated by a user console 206.

The console 206 is a configuration tool or portal for the service. In one embodiment, the console is a display interface configured as a web-accessible tool, such as a set of TLS/SSL-secured web pages. A customer registers to use the service, and permitted users associated with the enterprise customer receive access credentials. Users may be authenticated and authorized to use the interface in any known manner. The console 206 provides the user experience, management and policy capabilities for the overall platform. The console 206 also exposes administration interfaces by which the service provider creates a customer account and instantiate a specific platform for the customer. This may involve the orchestration of a private cloud for the customer within the third party cloud compute infrastructure. Once the customer account is established, permitted users associated with the enterprise access and use the service. To this end, a given analytics application workload is processed using a simple user interface by which the user designates a simple data set, such as type of data to be moved, volume of data, type of workload engine, information about the analytic application, information regarding required SLA, or cost, etc. The enterprise customer preferably identifies the size of the workload using a simple and small set of generic categories (e.g., "small," "medium" or "large"), and identifies the enterprise data that will be subjected to the workload. The information provided by the user also indicates the one or more data sources from which the data will be obtained, as well as the "type" of the workload engine (e.g., Hadoop, MPP SQL, etc.). Based on this simple data set, the data cloud 208 (or "cluster") is created and made available to the enterprise user for workload processing.

In particular, the data cloud is instantiated based on the information captured by the console. As noted above, preferably the data cloud comprises the underlying cloud compute layer 202 (that does not get exposed to the user), as well as support for the workload engines (Layers A and B in FIG. 1). As noted above, preferably the provisioning of the data cloud 208 is done based on static information provided by the enterprise, or based on a "profiler" that profiles a specific workload and derives "optimal" provisioning based on cost, utilization and SLA requirements for the unique characteristics of the workload. The provisioning ensures adequate workload performance at a lowest cost cloud footprint.

The profiler and the resource-provisioning functionality greatly simplify the user experience and interface between the enterprise and the cloud. In the past, the end user interacted with the cloud directly and had to manually pick piece parts, such as type of nodes, number of nodes, specific type of database distribution, etc., often without a good understanding of how such selections impacted the overall performance. The provisioning capability in the platform simplifies the user interface for enterprises. Using the interface, the end user identifies a given service level (e.g., the processing of the workload needs to be processed "within X time") at a particular cost (e.g., $Y dollars per unit time). Based on these simple high level inputs and the other information in the user-configured data set, a profiler and resource provisioning function (FIG. 1, Layer D) optimally provisions the underlying cloud compute infrastructure without involving enterprise personnel into technical details. This provisioning typically is in the form of instructions that are provided by the platform to the underlying cloud compute infrastructure.

As also seen in FIG. 2, the services platform may provide a workload translator 210 to ensure that existing analytic tools (e.g., such as Business Intelligence, Advanced Analytics, etc.) that are deployed in the enterprise work seamlessly with the services platform. With the workload translator 210 in place, typically, such tools are just re-targeted to point to the services platform and do not need to be modified. A security and privacy layer 212 is operative to ensure that enterprise security and privacy policies are extended to the service platform. Preferably, the platform provides network and user-level AAA (access control, authentication, and authorization). Preferably, access control is role-based and extended from the enterprise directory, such as Active Directory or LDAP. Preferably, additional role segregation is supported. As previously noted, data security is provided via encryption of data, preferably during transit and at rest. Optional features include the ability of the enterprise to control and manage the keys independent of the cloud provider or the service platform administrators. The security and privacy layer also provides for secure logging, auditing and monitoring, including alerting on any system or data-level incident. The platform may also provide compliance reporting that allows enterprises to extend their compliance posture to the cloud environment.

With the above as background, the techniques of this disclosure are now described.

Cloud Data Lake Platform and SaaS Orchestration

Figure 3:
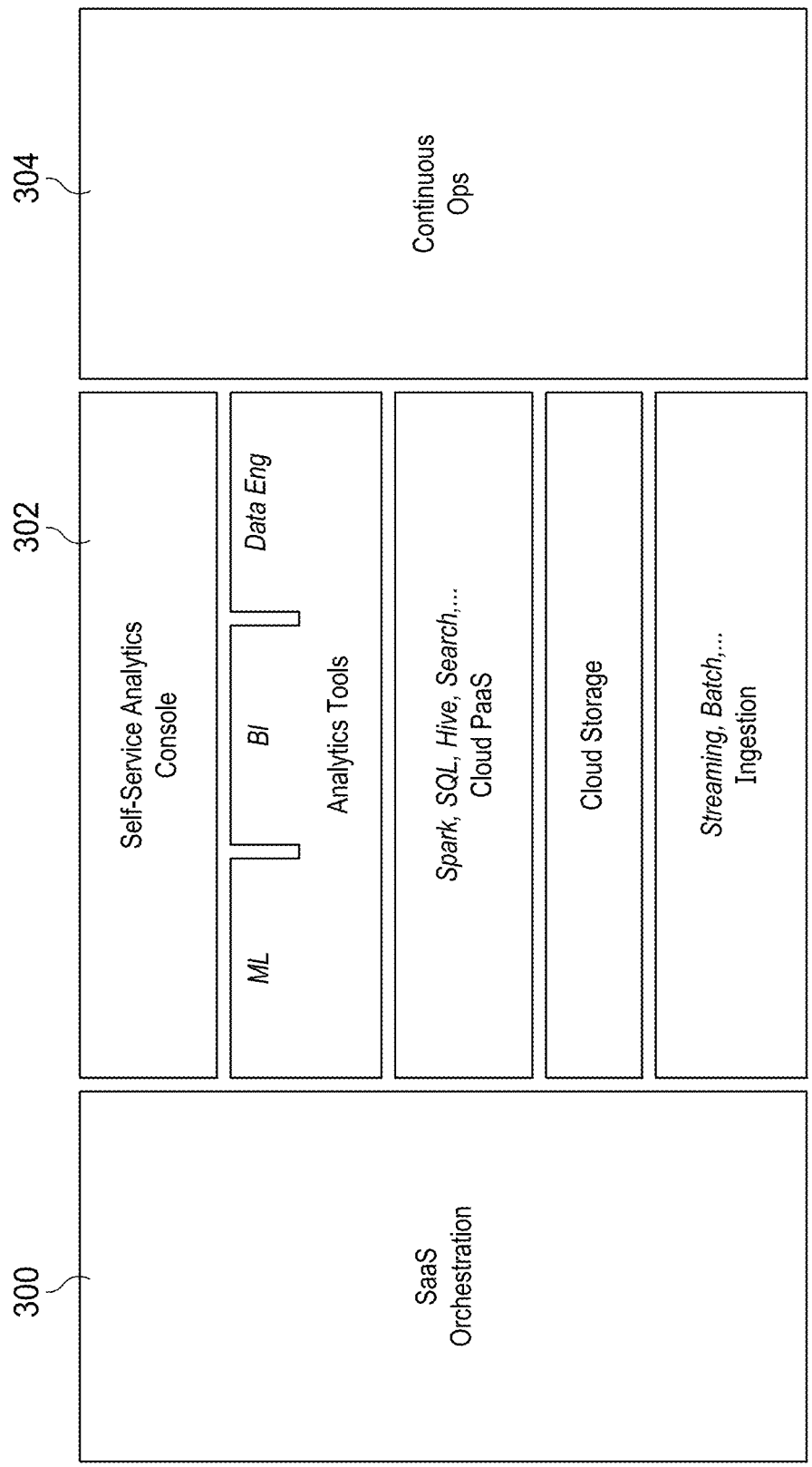
FIG. 3 depicts an implementation of a data lake provisioning and operations platform according to this disclosure.

As depicted in FIG. 3, the approach herein is implemented preferably using three (3) automated capabilities: SaaS Orchestration 300, which provides automated provisioning of a complete production cloud data lake; Self-Service Analytics 302, which provides for a simplified SaaS-based console that enables analysts and data scientists to instantly run analytics in the data lake using popular tools; and Continuous Ops 304, which provides ongoing operations for workloads, cost, security, and SLAs (service level agreements). Although the components 300, 302 and 304 are shown as distinct, this is not a requirement. These components may be integrated in whole or in part. The platform typically embeds (or has access to) a variety of best-of-breed or cloud-native PaaS, IaaS, and analytical tools, providing enterprises with maximum flexibility of price/performance and ease of use.

SaaS Orchestration

Data lakes require different cloud stack capabilities to be integrated, configured and optimized together for a production cloud data environment. According to this disclosure, the platform and method herein provide SaaS Orchestration around five (5) distinct capabilities to deliver a production-ready data lake; these capabilities include SaaS provisioning, identity management, security and privatization, hybrid deployment, and data governance and compliance. Together, these capabilities comprise a configured "data lake" according to this disclosure. Each of these capabilities is now described.

SaaS Provisioning: The platform unifies infrastructure, network, and security capabilities in a single "SaaS-as-code" instance, including (for example): data ingestion, cloud account and resources, cloud-to-enterprise virtual private networking, security perimeter, firewalls and encryption controls, storage management (object/attached/archival storage, such as S3/ADLS/ . . . ), PaaS data processing engines (such as SQL, Spark, Hive, NoSQL, etc.), and cloud infrastructure for analytical tools. According to an aspect of this disclosure, production-ready data lakes are accessible for analytics as soon as they are provisioned, and data lakes as provided for herein are provisioned with optimal "shapes" that deliver maximum performance, preferably within a user-defined cost threshold.

Identity Management: The platform also integrates disparate PaaS, cloud, and tools identities, thereby addressing a known friction point for enterprises deploying cloud data lakes. The SaaS data platform solution automates a uniform authentication and authorization mechanism across analytic tools, PaaS data processing engines, and the cloud storage resources, so that enterprise identities can be seamlessly managed with the data lake.

Security and Privatization: The SaaS data platform also automates the security policies around the data lake so that all external access is blocked with an enterprise firewall, allowing access only from specific private endpoints in the enterprise. This level of isolation makes the data lake a "private single tenant" data environment for each customer in the cloud datacenter of their choosing.

Hybrid and Multi-Cloud Deployment: Preferably, data lakes as provisioned according to this disclosure are "wired" to the enterprises with an intelligent hybrid architecture to ensure that on-premises data users and administrators all get easy access. To this end, the data lake looks like a seamless extension of the enterprise network, while it has complete security isolation at a physical level.

Data Governance and Compliance: The SaaS data platform preferably also configures auditing, discovery, and cataloging to ensure that all data access within the data lake is logged and the provenance is maintained. Preferably, data access is made visible to administrators; additionally, preferably historical system and data access activity is also centralized for compliance reporting. The SaaS data platform offers preferably offers industry-standard compliance certifications, such as SOC II-Type 2.

The following provides additional technical details regarding an implementation of the above-described platform and orchestration implementation.

In one embodiment, the SaaS-based orchestrator 300 is specifically implemented using Terraform, which is a tool for building, changing, and versioning infrastructure safely and efficiently. Terraform, which is available as an open source tool, allows the system to define numerous modules and relationships between them, thereby creating infrastructure-as-code. Preferably, each Terraform module relies on one or more "providers" to implement the underlying resources. Preferably, existing providers are extended with one or more custom providers plus custom Python, Groovy, Java, and shell script to create the turnkey service of this disclosure.

Terraform allows definition of phases of deployment, and it treats each phase as an idempotent and dynamic stack. Once the code for the data lake being provisioned is created, the Terraform infrastructure dynamically generates module dependencies based on defined system rules, creates a resource map of what exists and what needs provisioning, and then drives towards a complete and successful deployment. A typical deployment results in a large number of resources under management, all of which typically have a complex web of interdependencies that the platform then manages for the customer. Preferably, the state of these resources is captured and securely stored for future system upgrades and expansion. The Terraform solution allows the system more surgical control over changes to the deployment, e.g., to cope with dynamic workloads, upgrades, and expansion.

As an example, the following describes one specific process and implementation of the SaaS data platform and SaaS orchestration. For this implementation, it is assumed that the data lake resides within a private cloud environment (for illustration, referred to by AWS as a Virtual Private Cloud) within a Cloud provider such as AWS or Azure. This is not a limitation, however. For this example, the following steps are then carried out via automation:

Creation of a Customer-Specific Cloud Account

Because this is a private cloud environment, preferably the first step that occurs is to create a private cloud account for the deployment. A private account defines a logical boundary around the resources provisioned such that they can only be used by entities that have access to that account. Typically, there is one cloud account per platform customer. This is known as a single-tenant environment, meaning that customers do not share cloud accounts.

Creation of a Private Cloud Environment to Hold a Single Customer's Data Lake

Figure 4:
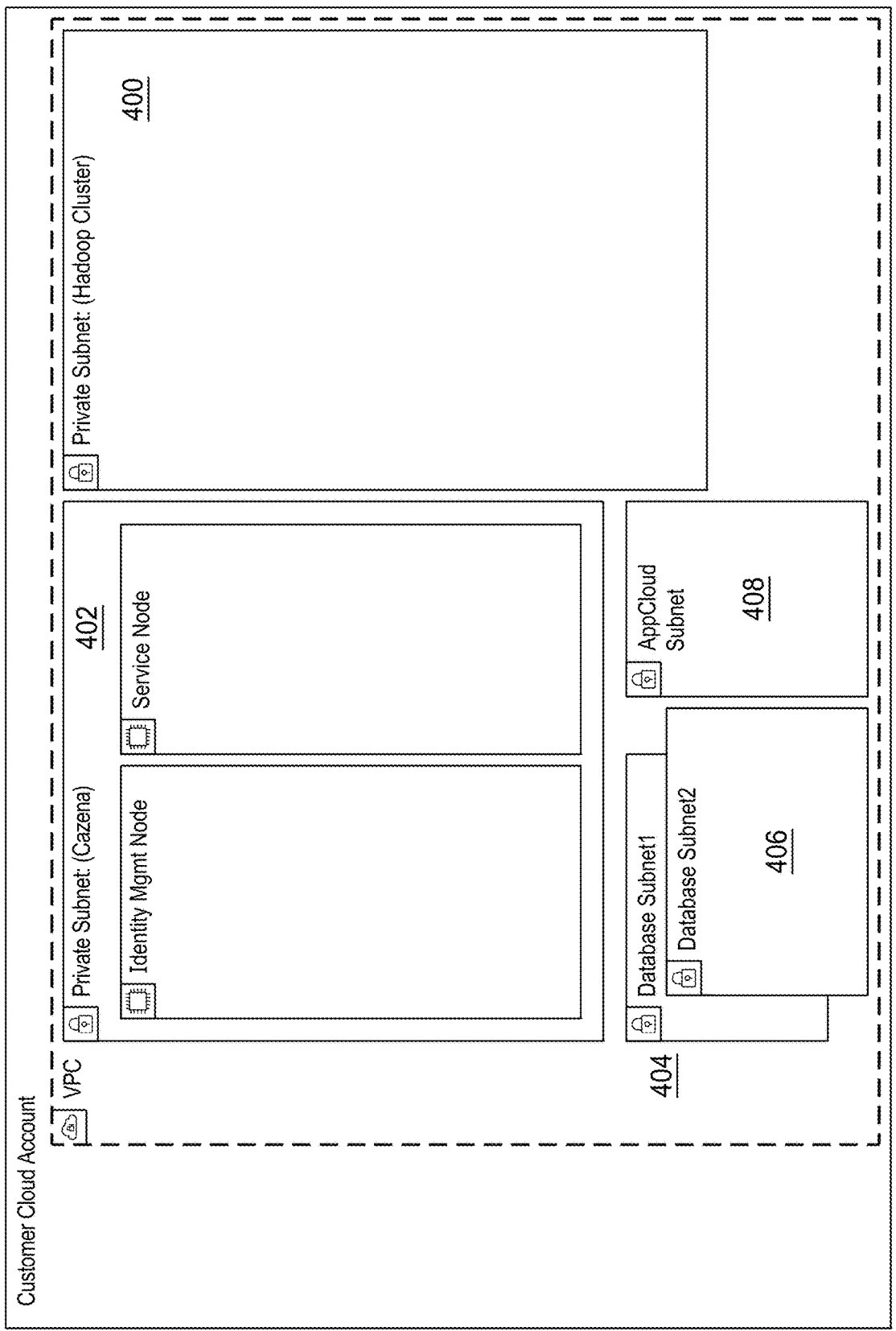
FIG. 4 depicts a representative subnet architecture of the platform.

Within the private cloud environment, the SaaS data lake preferably is provisioned across a plurality (preferably five (5)) private subnets. This configuration is depicted in FIG. 4. One subnet 400 is for the data lake engine, such as Cloudera® CDH/CDP™ or AWS EMR™. A second subnet 402 preferably contains provider services such as monitoring and alerting, orchestration (lifecycle management), identity management and a user-visible portal through which the provider services are accessed and managed by the user. The third and fourth subnets 404, 406 preferably comprise a database replica pair to hold persistent state for the data lake users. The fifth 408 and last subnet preferably holds a cloud application infrastructure (e.g., AppCloud™ and AppCloud applications). Once these subnets are created, the next step is to fill them to create compute services, and to fill out the data lake.

Provisioning and Configuration of Service Nodes

Figure 5:
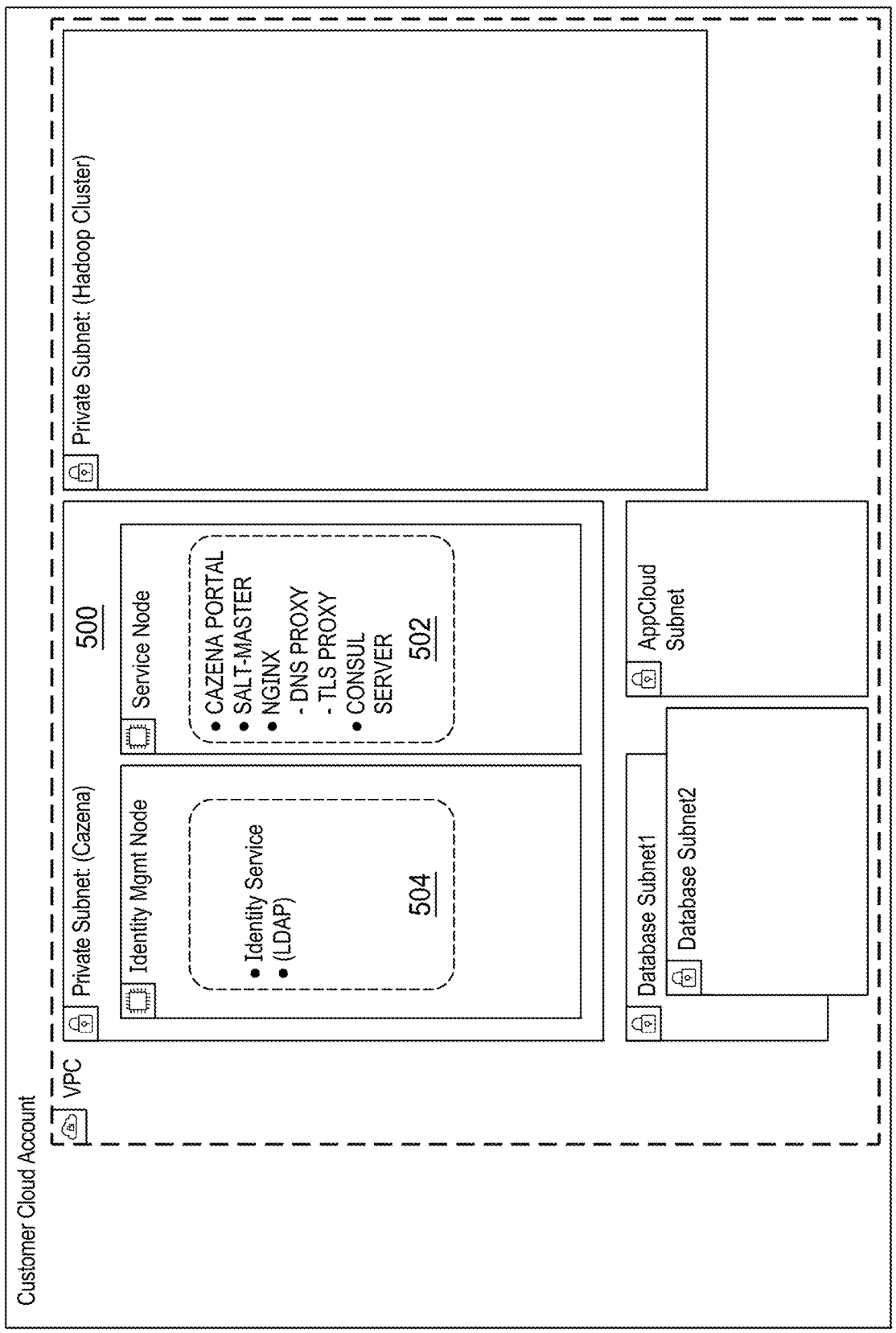
FIG. 5 depicts the provisioning of the service node subnet.

With reference now to FIG. 5, within the Provider Services subnet 500, the Service Node 502 is first provisioned and deployed. The Service Node hosts orchestration services, user console, service registry, and a configuration management server. DNS entries are then configured for the console, service registry, service node, and configuration management server. Within the Provider Services subnet 500, an Identity Management Node 504 is provisioned and deployed to host Identity Management and Authorization services. As noted above, integrating disparate PaaS, cloud, and tools identities is a big friction point for enterprises deploying cloud data lakes. The SaaS platform of this disclosure automates a uniform authentication and authorization mechanism across analytic tools, PaaS engines, and the cloud storage resources, so that enterprise identities can be seamlessly managed with the SaaS data lake. This is a challenging due to the variety of authentication technologies (such as LDAP, Kerberos, Microsoft Active Directory®, etc.) and connectivity models (such as web interfaces, APIs, and direct shell access) that need to be supported for the flexibility enterprise customers expect. To this end, the system configures the necessary identity management server solutions (such as FreeIPA), identity brokers (like Keycloak) to provide single sign on (SSO), and federated authentication via existing enterprise solutions. While these are specific implementation details, other similar offerings can also be used instead.

Provisioning and Integration of Data Processing Engines and Analytics Services

Figure 6:
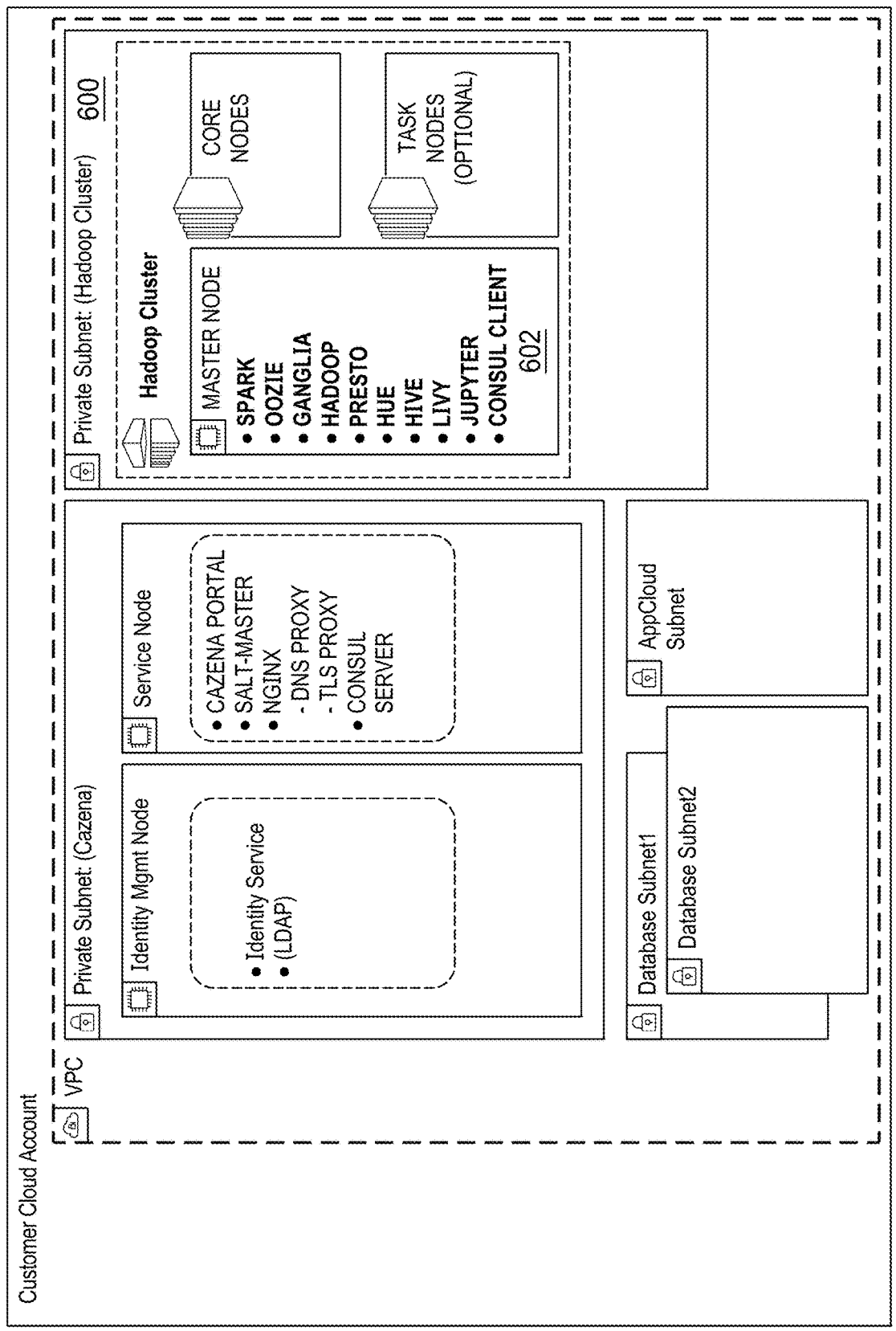
FIG. 6 depicts the provisioning of the data lake subnet.

With reference now to FIG. 6, within the data lake subnet 600, the orchestrator provisions and deploys specific data lake engines (CDP, EMR, etc.) and services (as examples, Hue, Jupyter, etc.), across a pre-computed (custom size for customer workload) set of instances 602. The orchestrator also defines security rules for the data lake environment and the resources (nodes and services) within. The orchestrator defines DNS entries for services within the data lake environment (Hue, Jupiter, master node . . . ) so that users can directly interact with these services. The orchestrator also configures storage requirements, provisions storage buckets and defines access, both permissions and encryption on the cloud object Store (e.g., S3). Preferably two buckets are provisioned, one for data and one for configuration.

Configuration of User History and Service Persistence

Figure 7:
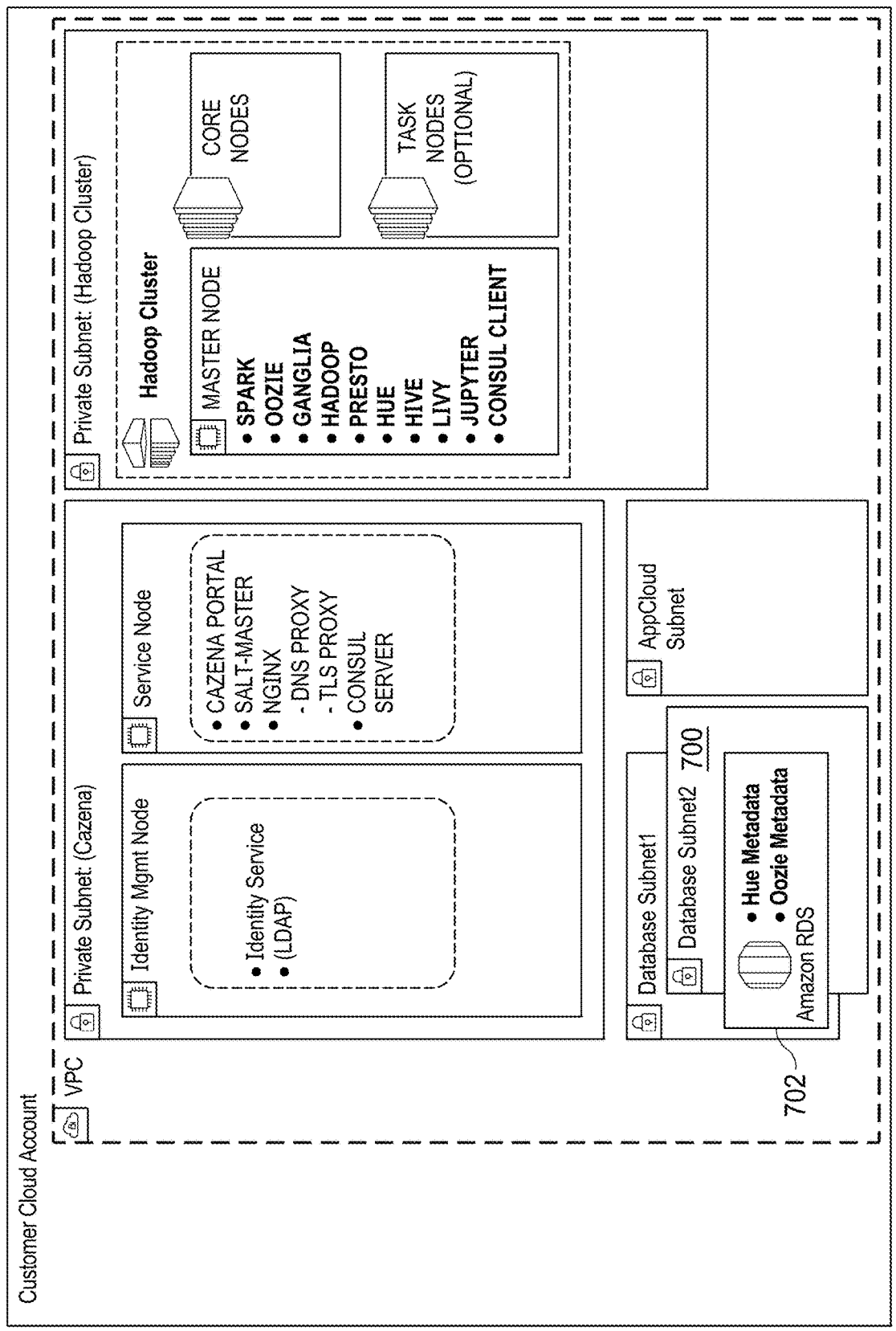
FIG. 7 depicts the provisioning of the database subnet.

As depicted in FIG. 7, within the database subnets 700, the orchestrator provisions a highly available database 702 to hold state from various data lake services so that the state is not lost when a cluster is destroyed and then recreated. Preferably, the master database resides in one subnet, the replica in the second subnet. The orchestrator also defines the security rules for database access.

Configuration of the Central Service to Hold Secrets

Preferably, the orchestrator also provisions a "secrets manager" service to hold passwords and encryption keys. The platform also ensures all secrets are encrypted with a key unique to each customer's deployment. Additionally, the platform applies secret access policies to ensure the principle of least access is maintained: only those entities that require access have access. The system automates the complexities and nuances of cloud secret management to avoid accidental or intentional misuse to ensure our customers' enterprises remain safe and secure.

Configuration of the DevOps and SecOps Monitoring and Alerting

Figure 8:
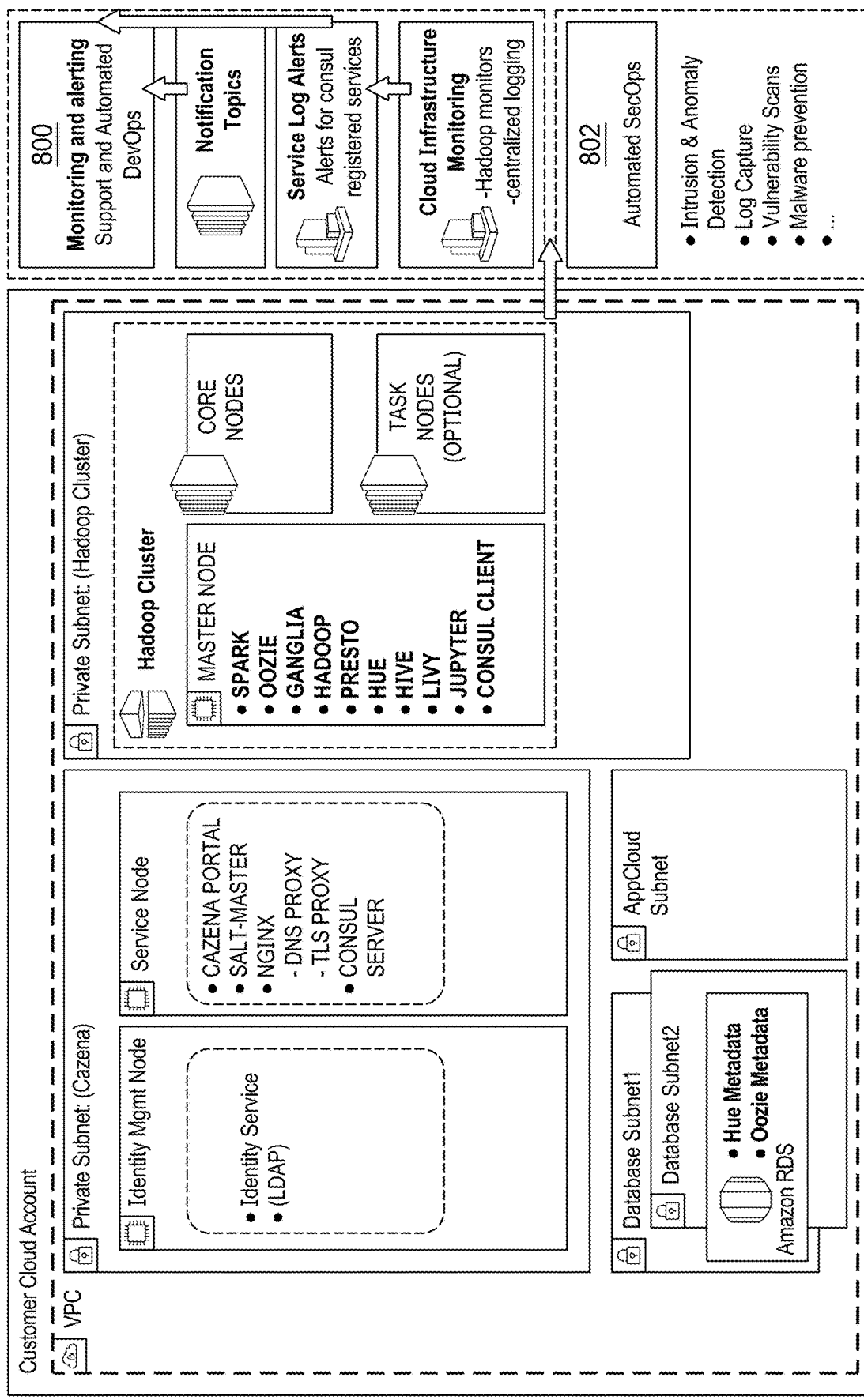
FIG. 8 depicts the provisioning of supporting SecOps and DevOps monitoring infrastructure.

As depicted in FIG. 8, the orchestrator also preferably defines DevOps 800 and SecOps 802 monitoring and alerts on the service node data lake services. Leveraging cloud native technologies (e.g., like AWS CloudWatch, Azure Monitor, and the like) and supplemented by cloud independent software (e.g., such as Splunk, Lacework, Sensu, and ManageEngine), the platform handles the challenge of exposing key metrics and logs to centralized alert rules in order to effectively manage each customer environment. Moreover, the platform preferably also distills each customer environment's key performance indicators to a centralized Operations hub to ensure that DevSecOps staff are aware of any and all inconsistencies across our customer base, all without needing to access the system(s) or perform time-consuming manual investigations. These capabilities allow the data lake SaaS model to scale as needed to satisfy SLAs across all enterprise customers.

Preferably, the platform provides robust scaling through automatic classification of notable events into several categories. For anything that requires immediate human intervention, preferably alerts are routed through an OpsGenie-powered dispatcher to the on-call staff for the area of the issue. These alerts can fire at any time of the day or night, so it is important to ensure they have immediate, actionable value to warrant this urgency. The next level of notice is for items needing eventual human intervention, which preferably are routed to Zendesk, where a ticket is automatically created for later action by service provider staff. This ensures there is a record of the issue that will be triaged and acted on according to its priority. The final category is for issues that are notable, but that do not necessarily require human intervention at the time raised. Those end up as log messages that can be surfaced in a variety of ways, or to train machine learning models to correlate with other factors, such as workloads ongoing at that time, so that the platform then evolves its automated responses for these issues.

Provisioning of AppCloud Hosts

Figure 9:
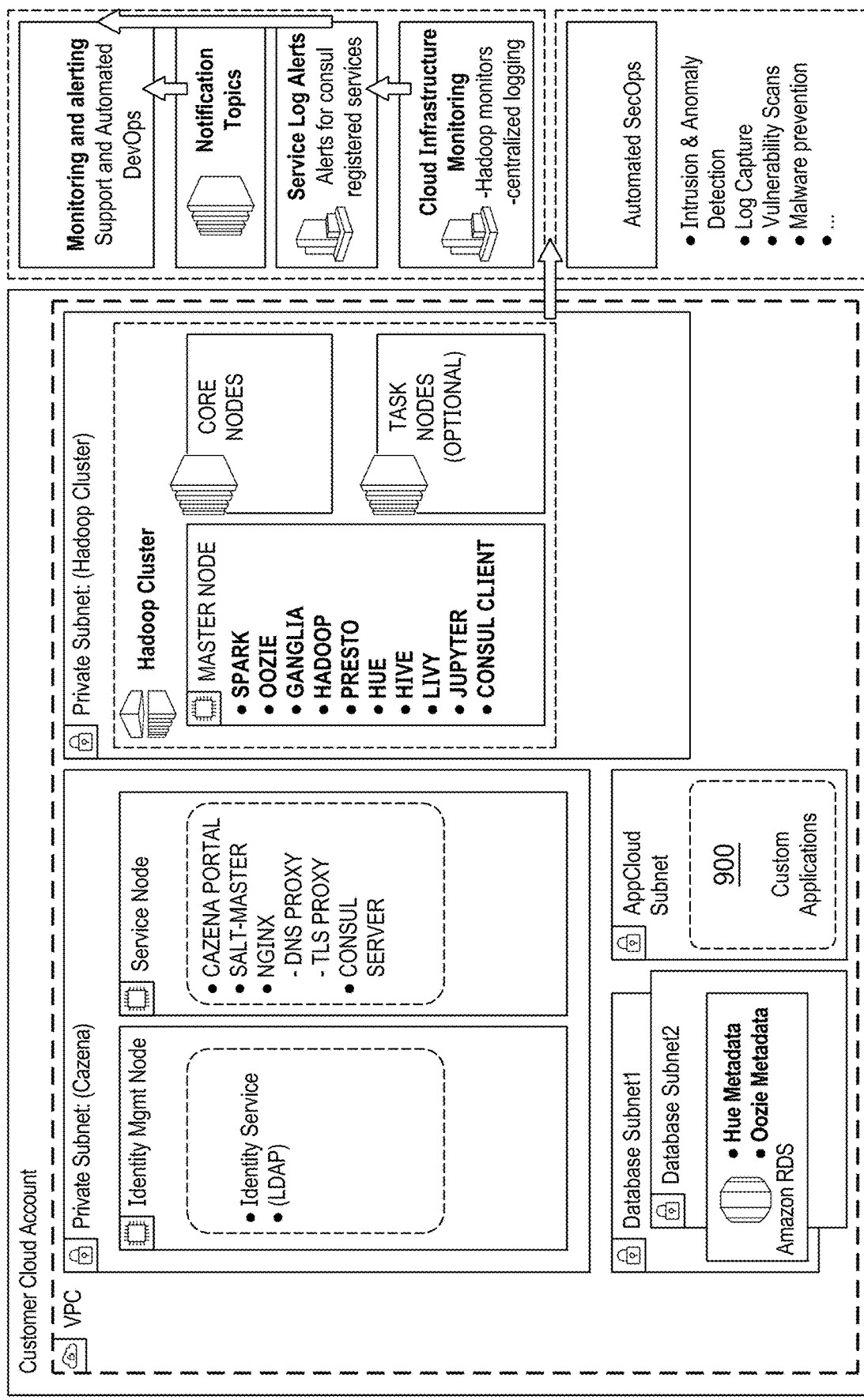
FIG. 9 depicts the provisioning of the cloud applications subnet.

As depicted in FIG. 9, and in the AppCloud subnet 900, the orchestrator provisions and configures a host to hold user-specified applications.

This completes the subnet provisioning. Although the subnet provisioning is preferably sequenced as has been described, this is not a limitation, as one or more subnets may be configured in parallel, or in one or more different sequences.

Security Management & Configuration

Figure 10:
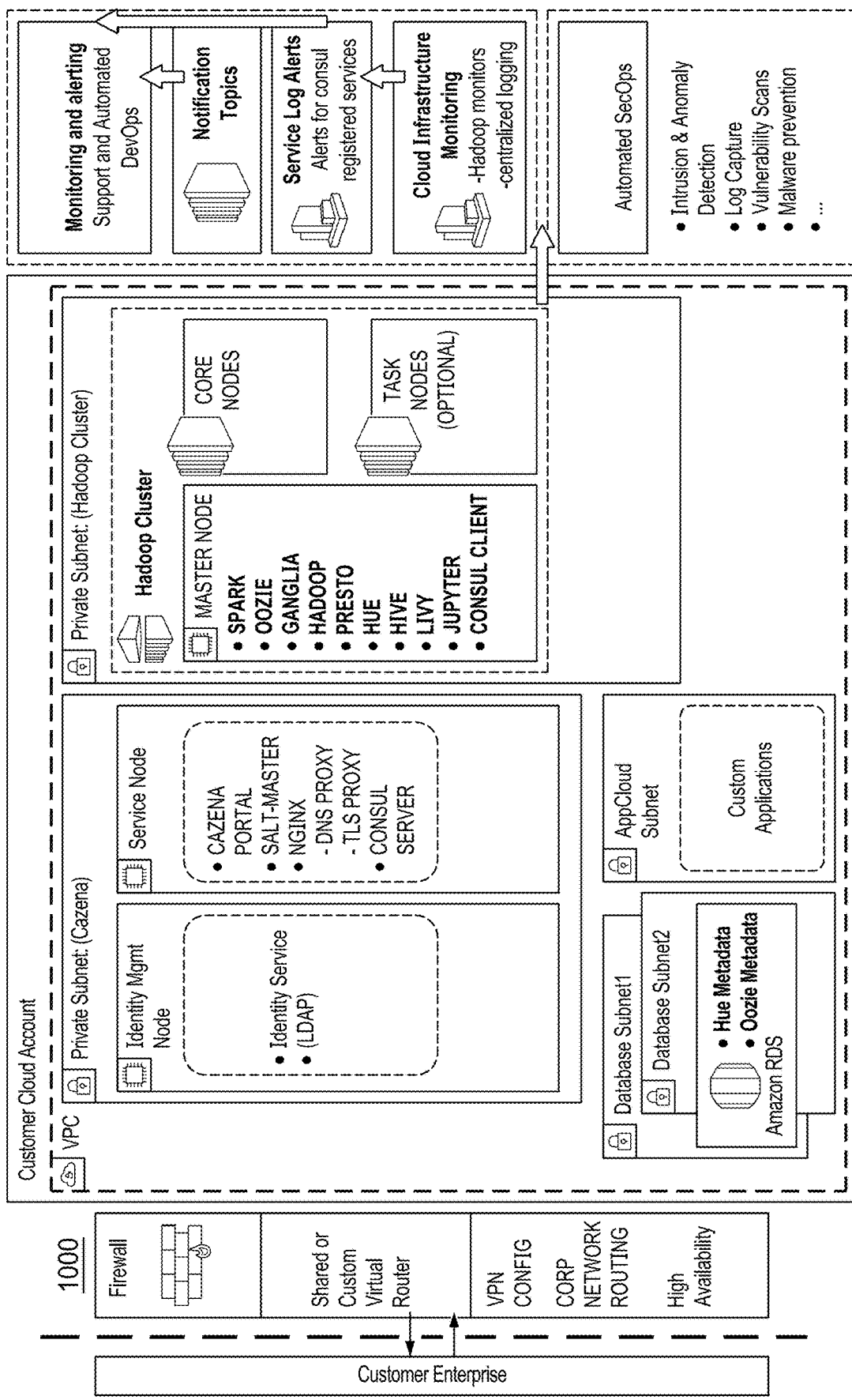
FIG. 10 depicts the provisioning of supporting security systems to ensure isolation of a customer's data lake.

As depicted in FIG. 10, preferably the orchestrator places the data lake environment behind a firewall 1000 to hide public IPs and provide a secure and auditable ingress to the data lake. The orchestrator also defines a Network Translation (NAT) gateway to translate external IP addresses to internal destinations. The orchestrator associates the firewall with the newly provisioned data lake, and the orchestrator also set ups specific security rules for firewall access.

The above-described SaaS-based platform automates the steps in the deployment of a generic PaaS or Cloud Data Platform, thus providing a dynamically-provisioned SaaS experience.

Integrated Authentication and Authorization

The following provides additional details regarding the providing of authentication and authorization for SaaS data lakes that have been provisioned as described above. The integrated authentication and authorization framework herein is implemented in association with an architecture and platform to automatically provision secure infrastructure in any cloud with an embedded PaaS (Platform-as-a-Service) stack containing third-party or cloud-native data processing engines. For example, a service provider that runs an architecture of this type provisions a data lake in Amazon® AWS or Microsoft® Azure. To this end, and as has been described, a logically-isolated virtual network is associated with the service provider's deployment account or a customer account, as the case may be. The logically-isolated virtual network is sometimes referred to herein as a "private data cloud" (PDC) or "virtual private cloud" (VPC) because preferably it is single tenant-based and is not visible (accessible) via the public-routed Internet. The PDC is uniquely associated with the data lake. A firewall service enabling secure access between the data lake and an external enterprise network is also provisioned. The data lake is then provisioned in the private data cloud to complete the rapid deployment.

Figure 11:
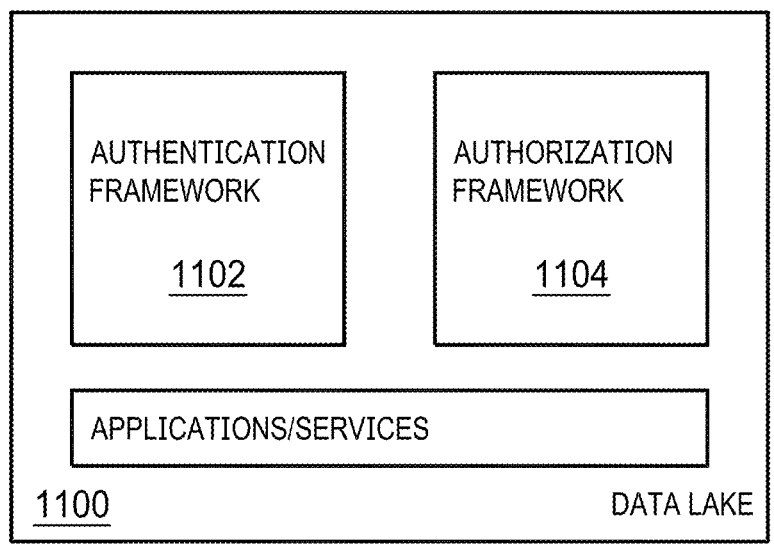
FIG. 11 depicts a data lake that is provisioned to include the integrated authentication and authorization frameworks of this disclosure.

FIG. 11 depicts the basic approach herein wherein the above-described data lake infrastructure 1100 provides integrated authentication 1102, and authorization 1104.

Authentication

Figure 12:
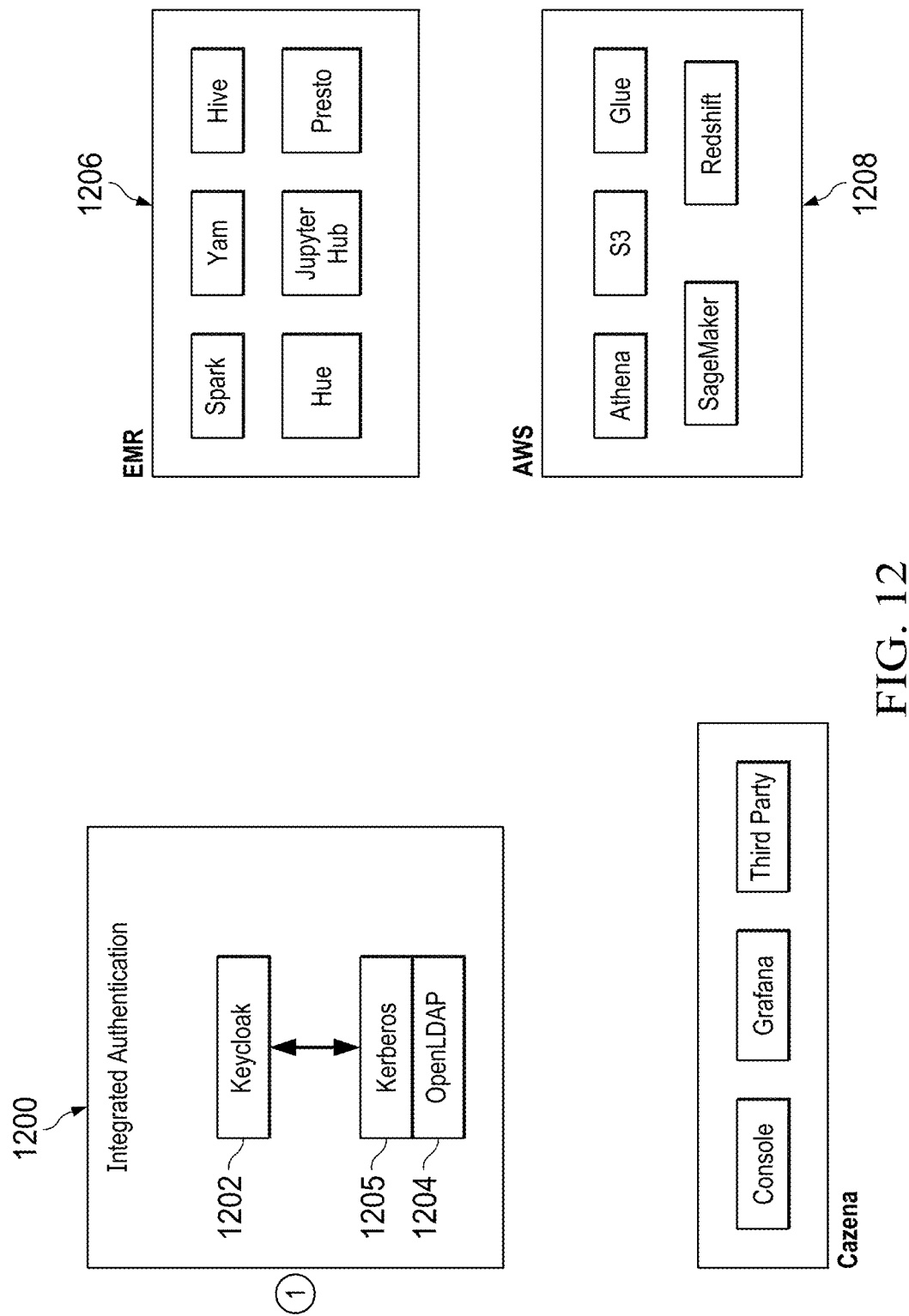
FIG. 12 depicts an integrated authentication framework of this disclosure and its provisioning in one embodiment.

As depicted in FIG. 12, the integrated authentication framework 1200 preferably leverages an open-standards based single sign-on (SSO) provider like Keycloak 1202 on top of OpenLDAP 1204 and MIT Kerberos 1205. The cloud data lake service provider 1207 (in this non-limiting example, Cazena) and several of its associated native services are also depicted. Representative cloud environments and their associated services are shown at 1206 (Amazon EMR) and 1208 (AWS). Keycloak is an open-source Identity and Access Management IAM solution that provides single sign on for secure access to modern web applications. This SSO is provided by leveraging open standards like OpenID Connect and SAML 2.0. The following steps describe representative provisioning and configuration process for a typical cloud data lake. In particular, and using Keycloak (or the like), the SSO provider manages user identities on its own, or it federates users from a corporate IDP. In this example, the SSO provider also configures its internal storage provider to use OpenLDAP/Kerberos, so that the same users are also available in secure applications like Yarn, Spark, Presto, and the like that require LDAP/Kerberos for user authentication.

Standards such as OpenID Connect and SAML 2.0 make it possible to add single sign on for web applications or API endpoints, as well as to add SSO to cloud native web user interfaces. There are other cloud data lake services (e.g., Hive, Spark), however, that are not user interface services. These types are services are not accessed via a web browser and thus must be authenticated with alternative mechanisms, such as LDAP and/or Kerberos.

To accomplish integrated authentication across these disparate services and applications, the following techniques are implemented. In particular, OpenLDAP is provisioned as part of the IDM stack (Identity Management). Kerberos is provisioned as part of the IDM stack as well, and it is configured to use OpenLDAP as its backend storage. Keycloak is extended by configuring a custom storage provider so that all users that get imported into Keycloak via SSO from a third party IDP (e.g., Azure AD) are also automatically created in OpenLDAP/Kerberos. Further, Yarn cluster's service level authentication is turned on to use this integrated OpenLDAP/Kerberos stack. Users can access services that use LDAP (such as Hive) and connect from business intelligence or analytics tools using a username/password combination instead of a web-browser based SSO (which is not an option in non-web-UI context). Similarly, users can generate a Kerberos ticket using kinit (running against the Kerberos KDC) and then invoke non-UI jobs (like spark-submit) using that authenticated ticket.

Figure 13:
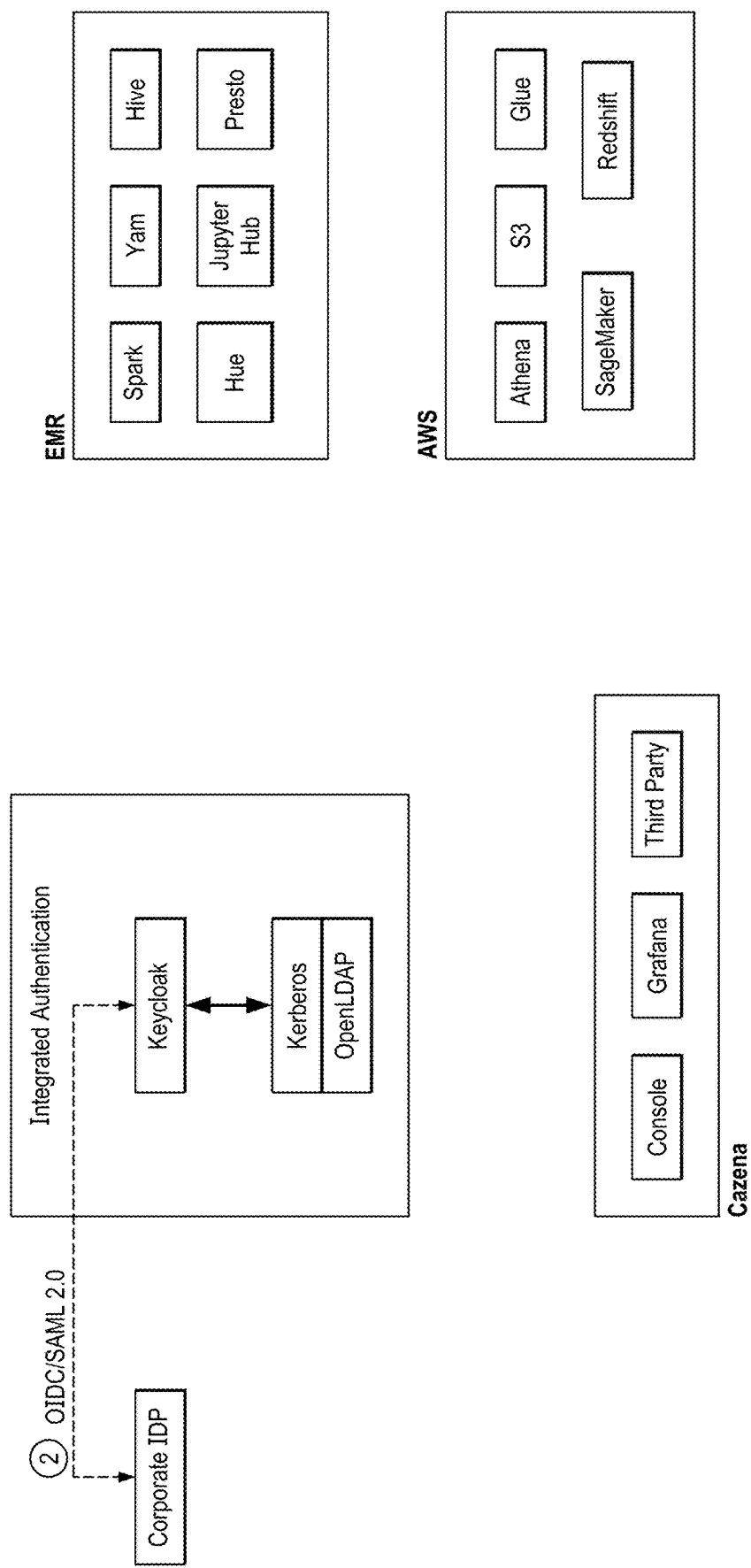
FIG. 13 depicts the integrated authentication framework of this disclosure and how it allows integrating third-party identity providers.

As depicted in FIG. 13, the integration authentication framework allows integrating third-party identity providers, e.g., using OpenID Connect or SAML 2.0 (Security Assertion Markup Language). Examples include Active Directory Federation Services or cloud-native IDP's like Azure AD, Okta, Auth0, etc. With this integration, the customers' existing users are federated into the data lake without having to provision them separately.

Figure 14:
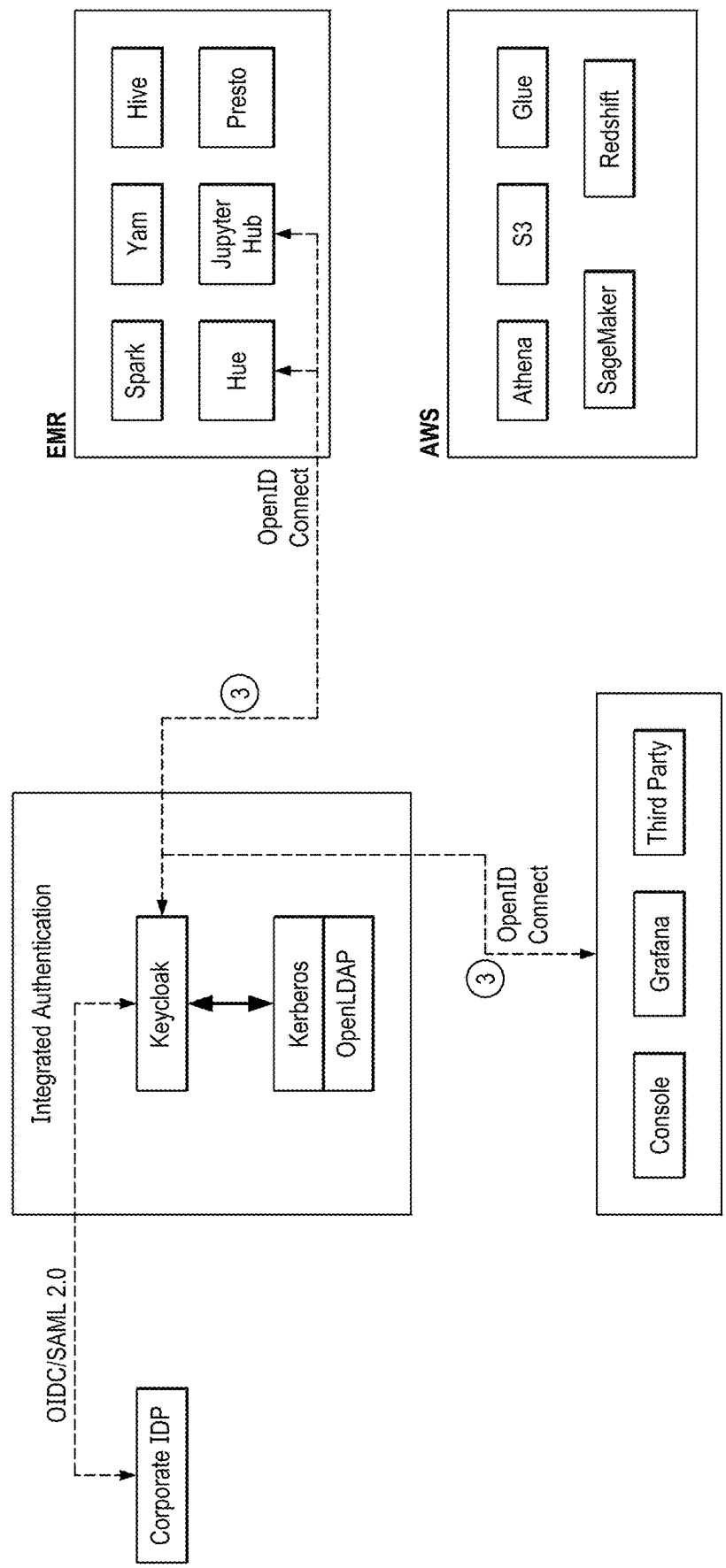
FIG. 14 depicts the integrated authentication framework of this disclosure and its support of Web applications as OpenID Connect or SAML 2.0 clients.

Federated authentication to web applications is facilitated as depicted in FIG. 14. OpenID Connect & SAML 2.0 (Security Assertion Markup Language) provide a standards-based approach for federated authentication in web applications. Many data lake applications like Hue, JupyterHub, Grafana, Cazena® Console support these standards as OIDC clients or SAML 2.0 service providers. In this example embodiment, the integrated authentication framework (and, in particular, the Keycloak component) acts as the identity provider (IDP) for these clients by establishing mutual trust during initial provisioning and configuration of these applications in the data lake.

Figure 15:
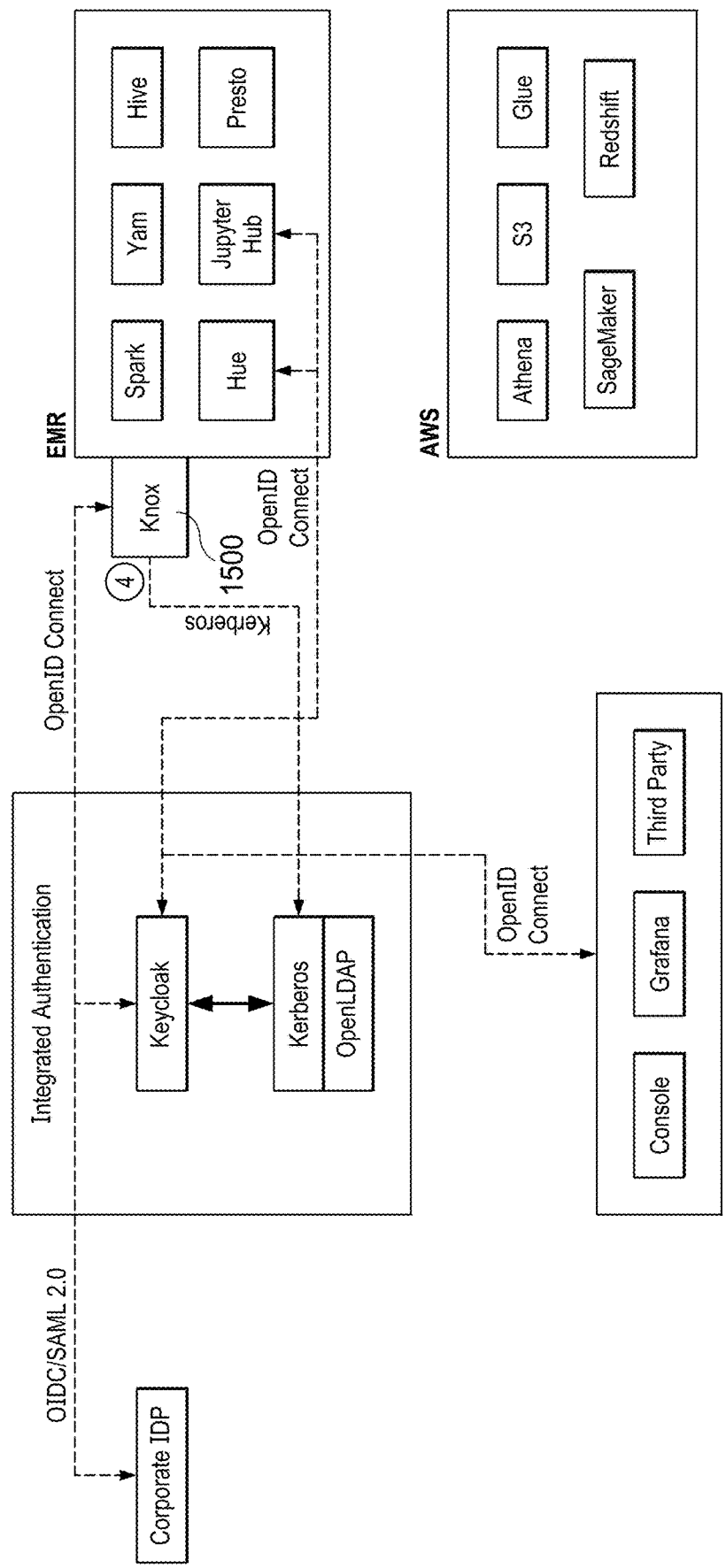
FIG. 15 depicts how the integrated authentication framework provides support for Hadoop web UI services in a secure (kerberized) EMR cluster requiring Kerberos for authentication.

The integrated authentication framework also enables single sign-on to Hadoop services using Knox and OpenID Connect. In particular, many of the Hadoop web UI services in a secure (kerberized) EMR cluster require Kerberos for authentication. Examples include Spark History Server and Yarn Resource Manager. Although Kerberos often is integrated with other identity management (IDM), authenticating to web applications via Kerberos is tedious. Instead, and according to another aspect, these applications are positioned behind Apache Knox as a gateway and use Knox SSO as an OpenID Connect client of Keycloak. FIG. 15 depicts this embodiment showing the Knox gateway 1500. Here, the users access these kerberized applications with a single sign-on from the web browser.

Figure 16:
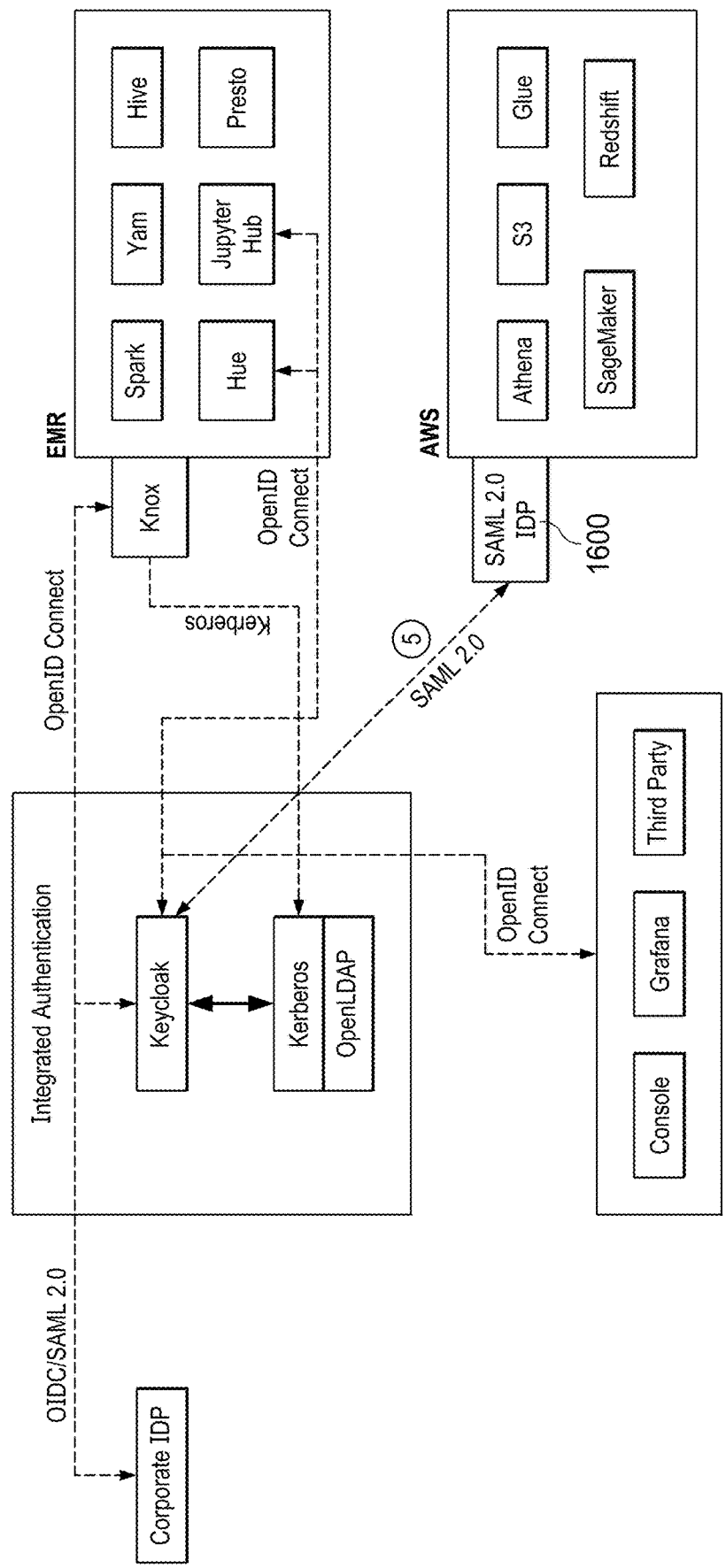
FIG. 16 depicts the integrated authentication framework and its support for federated authentication to a cloud provider.

FIG. 16 depicts how the framework is used to facilitate federated authentication to a cloud provider. By way of background, cloud providers often use their own representation of user identities—such as AWS IAM (Identity and Access Management) users and roles. To utilize cloud resources, the customers would need to create separate IAM users. Instead, the integrated authentication framework herein utilizes federated identities, e.g., by configuring Keycloak as a SAML 2.0 IDP 1600 in AWS IAM. The configuration step establishes mutual trust between Keycloak and AWS by exchanging their metadata and certificates, and by setting up required SAML attributes to be exchanged via web browser redirects.

Figure 17:
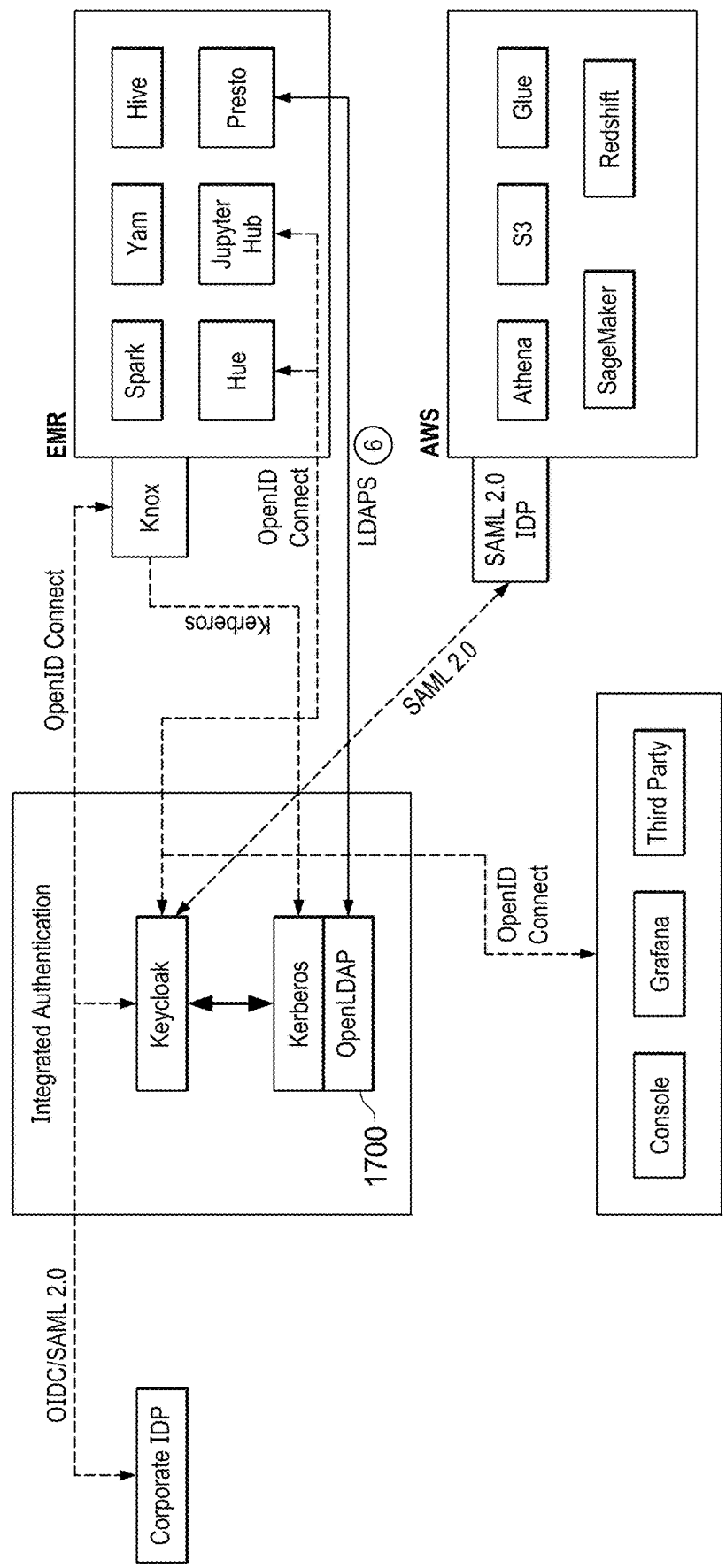
FIG. 17 depicts the integrated authentication framework and its support for secure LDAP authentication.

FIG. 17 depicts another embodiment, namely, support for LDAP-based authentication. As noted above, although most web applications can be accommodated by utilizing SSO standards like OpenID Connect or SAML 2.0, there may be a class of applications that require LDAP (Lightweight Directory Access Protocol) support for directory of users. As depicted, the integrated OpenLDAP server 1700 of the framework provides this functionality by keeping a one-to-one mapping between SSO and LDAP users.

Figure 18:
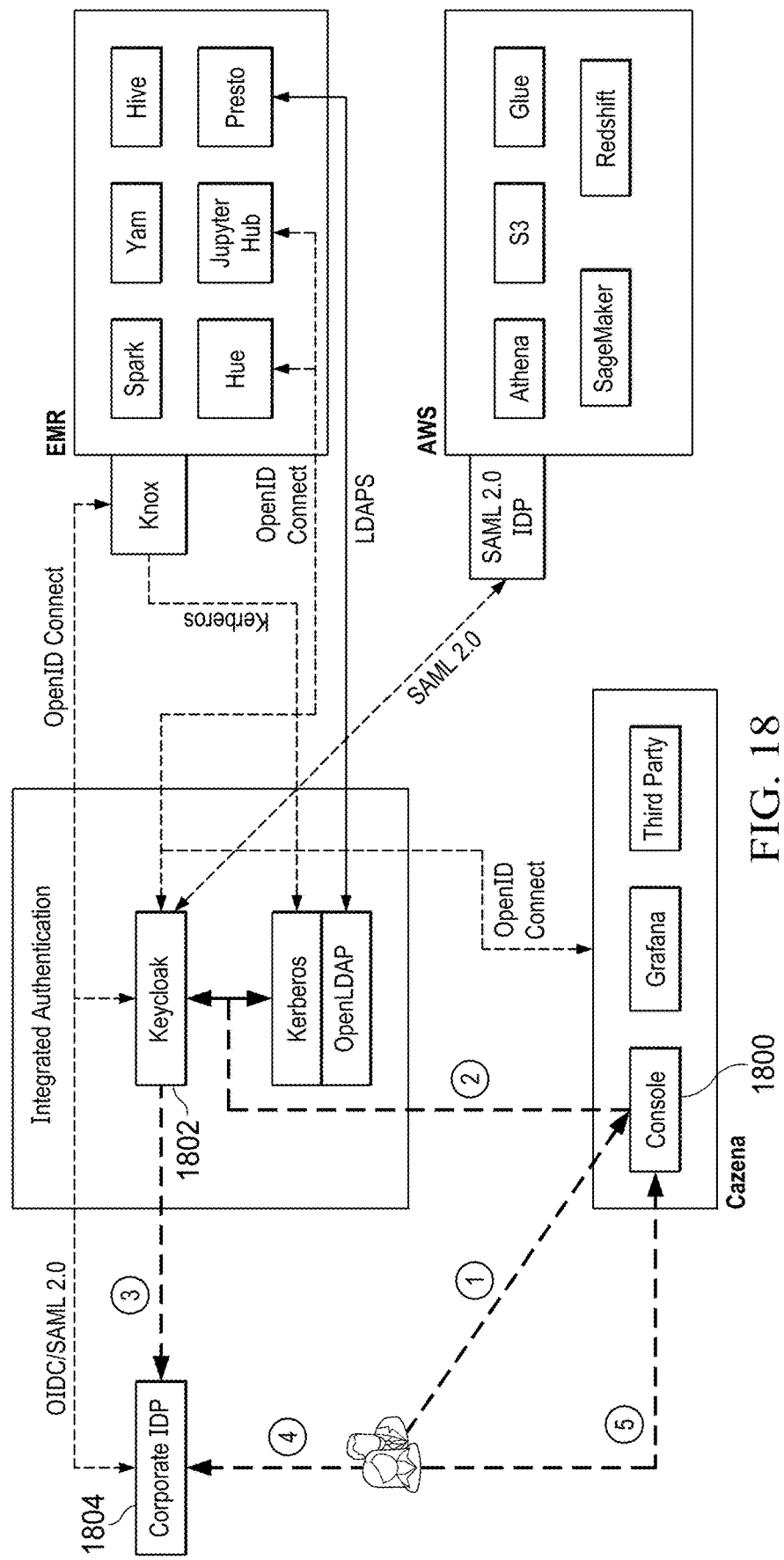
FIG. 18 depicts a user login workflow to a console associated with the integrated authentication framework.

FIG. 18 depicts the flow of steps when a user tries to login to a cloud data lake according to this disclosure. At step (1), the user access a console 1800 via a web browser. The console preferably is an OpenID Connect client of Keycloak. At step (2), and if the user is not already logged in, then the console redirects the user to Keycloak 1802 login screen. At step (3), if there is a third-party IDP configured (such as Active Directory), the user could choose that option. At step (4), the user enters his or her credentials in the corporate IDP 1804 and successfully logs in. At (5), Keycloak 1802 redirects the user back to the console 1800 with an SSO cookie—thus granting access as well as asserting the identity of the user. Because the console trusts Keycloak, and because Keycloak trusts the corporate IDP as its respective IDP, the console safely assumes that the user's identity has been verified successfully.

Figure 19:
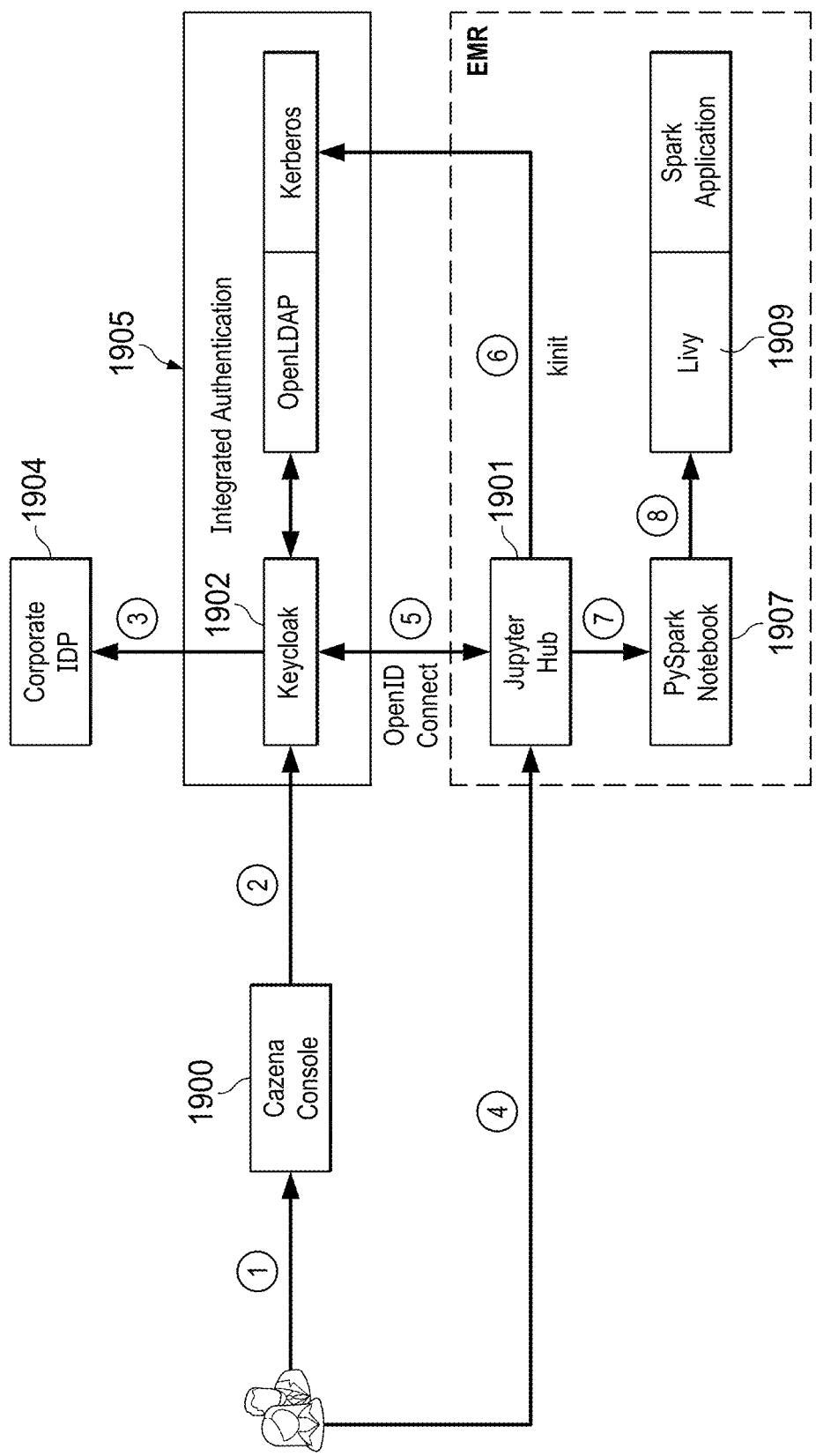
FIG. 19 depicts a representative single sign-on (SSO) workflow in association with the integrated authentication framework.

FIG. 19 depicts another use case. Here, JupyterHub 1901 provides a web-based notebook environment for data scientists to run Python, Scala or SQL workloads. When these notebooks use Spark as the execution engine and Spark is running on a kerberized EMR cluster, the user requires a login to JupyterHub web UI as well as a Kerberos ticket to access the Spark cluster. The authentication framework of this disclosure eliminates this tedious multi-step process as part of the single sign-on as follows. At step (1), the user connects to the console 1900 via a web browser. As described, preferably the console is an OpenID Connect client of Keycloak 1902. At step (2), it first redirects the user to Keycloak for login. At step (3) Keycloak, in turn, redirects the user to a pre-configured corporate IDP 1904 such as Active Directory. At step (4), once corporate IDP and Keycloak verify the identity, the user is sent back to the console with successful login. The user now clicks on the link for JupyterHub 1901. At (5), since JupyterHub is also pre-configured as an OpenID Connect client, it trusts the identity of the user as asserted by Keycloak. At (6), JupyterHub's custom spawner uses the user's identity to request a Kerberos ticket from the integrated MIT Kerberos server 1905 and performs a kinit on behalf of the user. At (7), with the user's identity asserted, the user launches a PySpark notebook 1907. At (8), any Spark code executed by the user is sent to Spark via Livy REST API 1909 along with the Kerberos ticket generated in step (6)—thus granting the user access to the secure cluster. The entire process is transparent to the user via web browser redirects. The user only enters the password in the corporate IDP login screen and those credentials are never known to the framework provider or the cloud provider.

Figure 20:
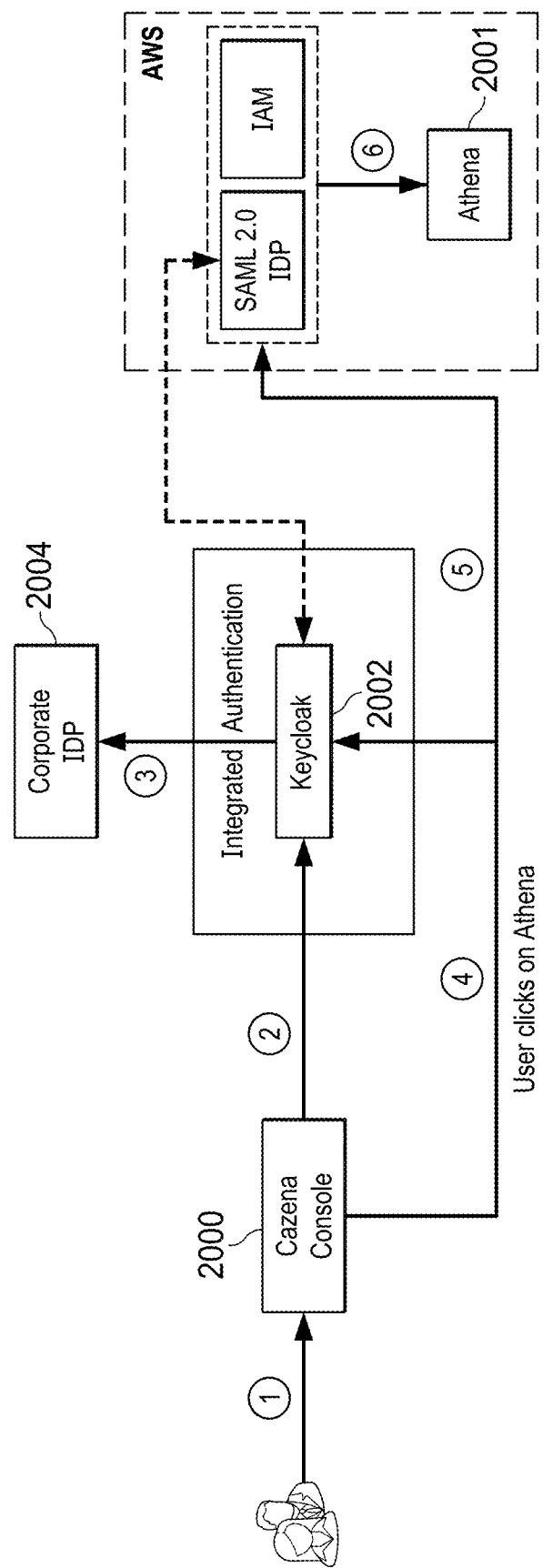
FIG. 20 depicts a SSO workflow to a cloud native service in association with the integrated authentication framework of this disclosure.

FIG. 20 depicts still another use case, namely, single sign-on to a cloud-native service like AWS Athena 2001. During data lake provisioning, preferably Keycloak 2002 is configured as a trusted SAML 2.0 IDP in AWS IAM by exchanging metadata including certificates. The user flow to a cloud-native service such as AWS Athena looks as follows. At step (1), the user connects to the console 2000 via a web browser. At noted, the console is an OpenID Connect client of Keycloak. At (2), the console redirects the user to Keycloak for login. At (3) Keycloak, in turn, redirects the user to a pre-configured corporate IDP 2004 such as Active Directory. At (4), once corporate IDP and Keycloak verify the identity, the user is sent back to the console with successful login. The user now clicks on the link for Athena 2001. At (5), Keycloak creates a SAML assertion and redirects the user to AWS's SAML endpoint. The assertion also includes the role that the user should be granted in the cloud environment. It does this by creating a SAML attribute (e.g., https://aws.amazon.com/SAMUAttributes/Role) and setting its value (e.g., to "<IAM-Role-ARN>/<Keycloak-SAML-Provider-ARN>"). At (6), AWS then trusts the identity asserted by Keycloak via SAML, allows the user to assume the asserted role, and redirects the user to the requested service. Again, this process is completely transparent to the user through a series of browser redirects as defined in SAML 2.0 standard.

Summarizing, using the integrated authentication framework herein, a cloud data lake offers a seamless and secure authentication experience by providing single sign-on for all the analytics services it provides. The integrated approach herein achieves this unified identity by orchestrating a turnkey, secure and extensible authentication system, and further by incorporating standards such as OIDC/SAML 2.0, LDAP and Kerberos—thereby allowing data lake customers to maintain user identities in one place and setting a strong foundation for a secure data lake platform.

Authorization

According to this disclosure, the integrated authorization framework is provided for cloud data lakes. The framework uses a combination of open-source, industry-standard software such as Apache Ranger, as well as cloud-native services like AWS Lake Formation to provide a robust and comprehensive foundation for a secure data lake. Preferably, the integrated authorization framework combines best-of-breed access control mechanism ranging from cloud-native authorization (e.g., AWS IAM for coarse-grained access control), Apache Ranger policies for Hadoop services such as Spark, Hive, Presto, Kafka, etc., and cloud-native fine-grained policies for data access, such as AWS Lake Formation. The automated authorization framework integrates data access control from multiple applications under a single unified system for the entire cloud data lake.

Identity and Access Management (IAM) systems (e.g., such as provided by AWS), provides robust, coarse-grained access control policies for infrastructure and resources such as S3 buckets & objects, KMS (Key Management Service) keys, Secrets Manager, Glue Catalog resource policy, and IAM role-level access to services (such as Athena, SageMaker, MSK (Managed Streaming Kafka), etc.). However, for fine-grained data access control (such as for tables, columns and rows, and the like), IAM policies are insufficient. As will be seen, the integrated authorization framework addresses these gaps with more comprehensive, purpose-built solutions like Apache Ranger for Hadoop ecosystem and AWS Lake Formation for cloud-native services like Athena and Glue.

Apache Ranger is a known framework to enable, monitor and manage comprehensive data security across the Hadoop platform. Key features of Apache Ranger include: centralized security administration of data access policies, fine-grained authorization including row-level security and column masking that helps with protecting PII (personally identifiable information) from unauthorized access, standardized authorization across Hadoop ecosystem components (such as Hive, HDFS, Spark, Presto, Kafka, etc.), and centralized auditing of user access and administrative events. In practice, however, many cloud-native, managed Hadoop distributions such as EMR do not come configured with Apache Ranger. Accordingly, the following process describes the detailed steps executed by the integrated authorization framework of this disclosure.

Figure 21:
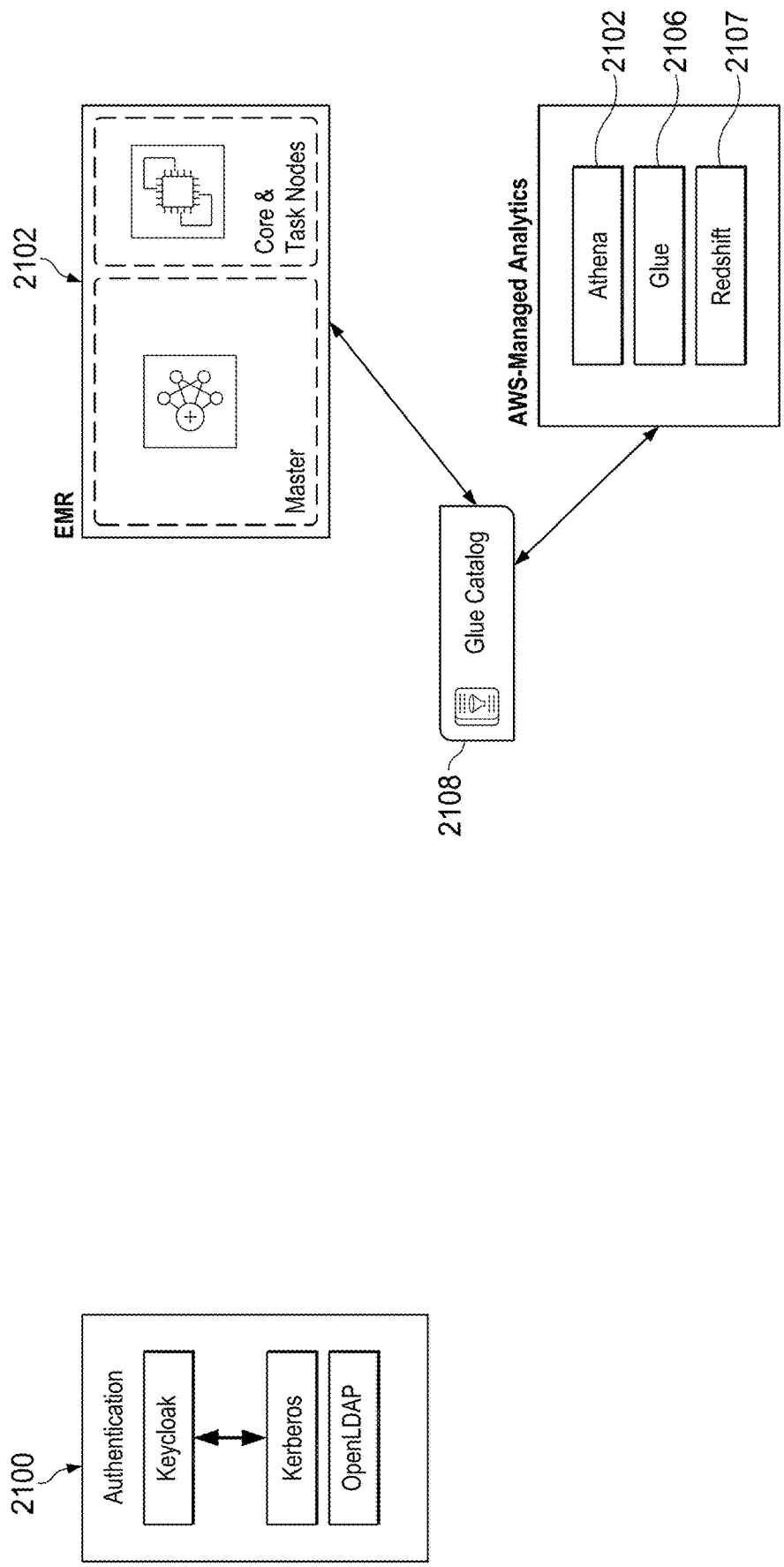
FIG. 21 depicts a cloud architecture in which the integrated authentication and authorization techniques of this disclosure are practiced.

FIG. 21 depicts a representative implementation, which also includes the integrated authentication framework 2100 as described. Other components in the data lake typically include a number of EMR clusters 2102, as well as serverless data analytics tools such as AWS Athena 2104, Glue 2106 and RedShift 2107. Typically, the data analytics applications use a shared Hive metastore (such as AWS Glue Data Catalog 2108) for sharing table metadata.

Figure 22:
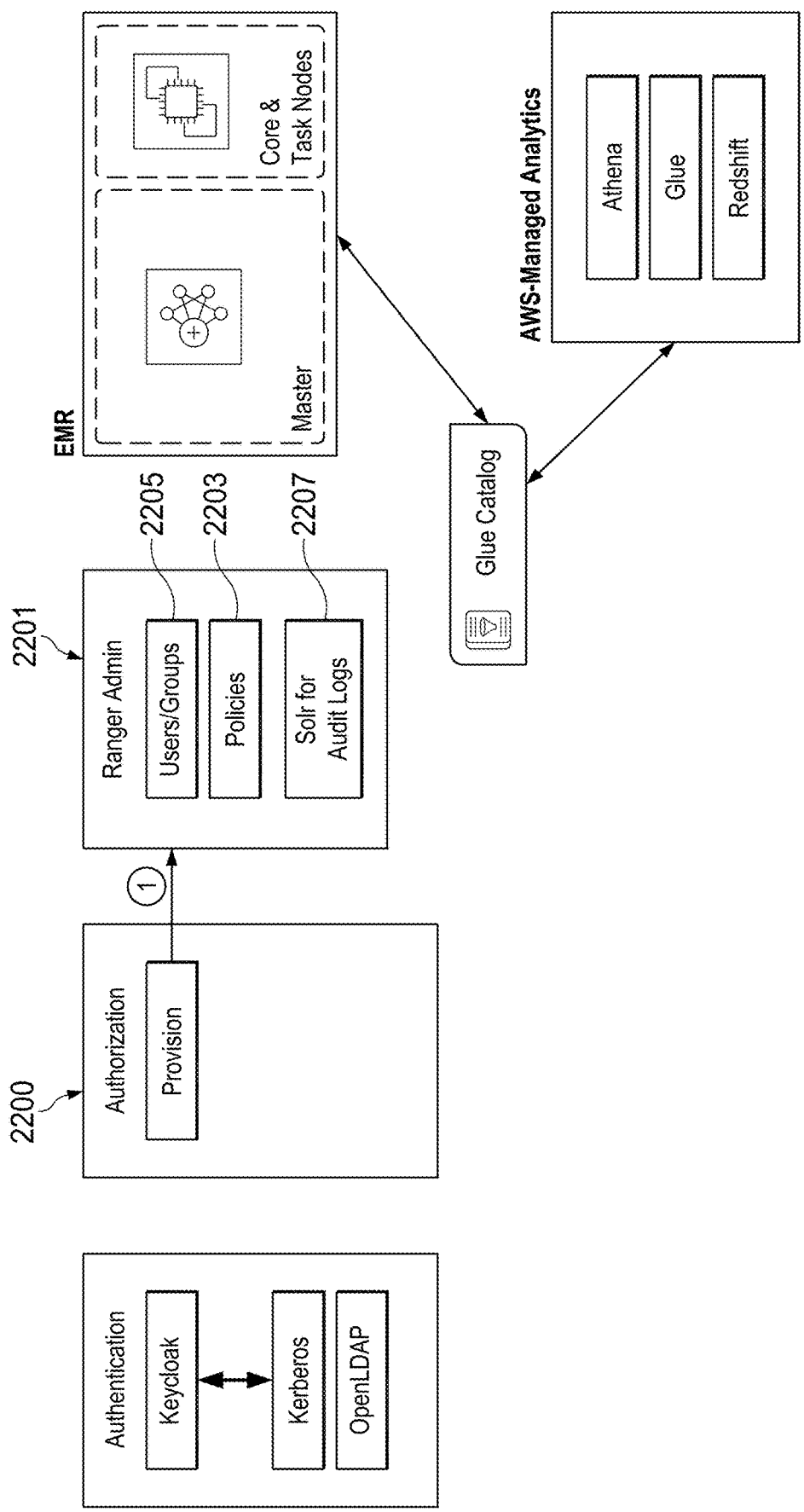
FIG. 22 depicts an integrated authorization framework of this disclosure in the cloud architecture shown in FIG. 11.

FIG. 22 depicts the provisioning and configuration of an instance of Ranger Administration (Ranger Admin) 2201 into the architecture of FIG. 21. In this example, the authorization framework 2200 orchestrates automated provisioning of a Ranger Admin server. Ranger Admin keeps track of data access policies 2203 by assigning or denying access control for tables/rows/columns to users and groups 2205. Preferably, and as also depicted, Apache Solr™ 2207 is also provisioned as a search index to keep track of data access logs to assist with auditing capability.

Figure 23:
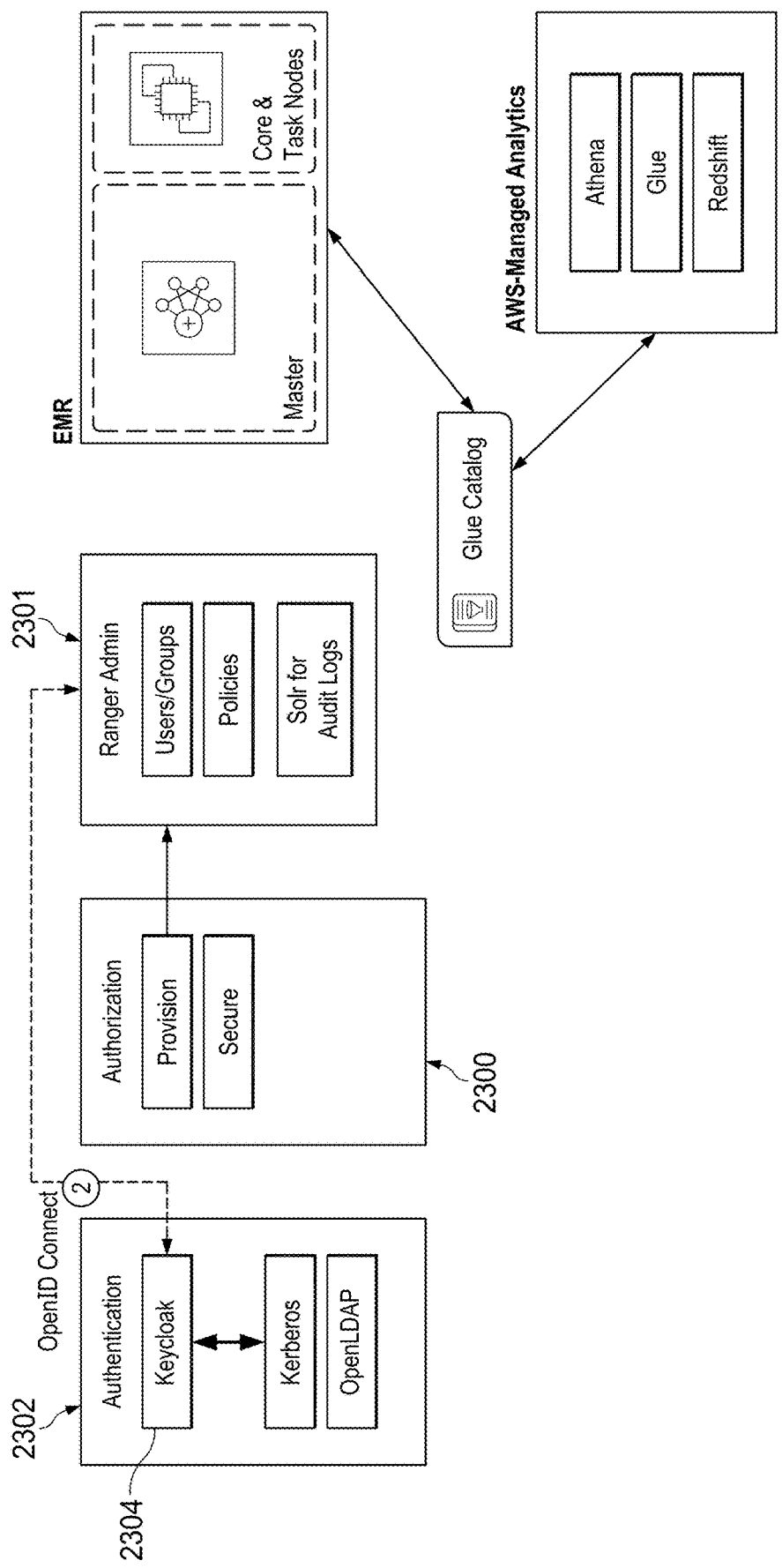
FIG. 23 depicts how the framework provisions a Ranger Admin instance.

FIG. 23 depicts how the Ranger Admin web application 2301 is secured with TLS (or HTTPS) by the authorization framework 2300. In this embodiment, the Ranger Admin login is also secured by using the integrated authentication framework 2302, and in particular it is connected to Keycloak 2304 with OpenID Connect for single sign-on.

Figure 24:
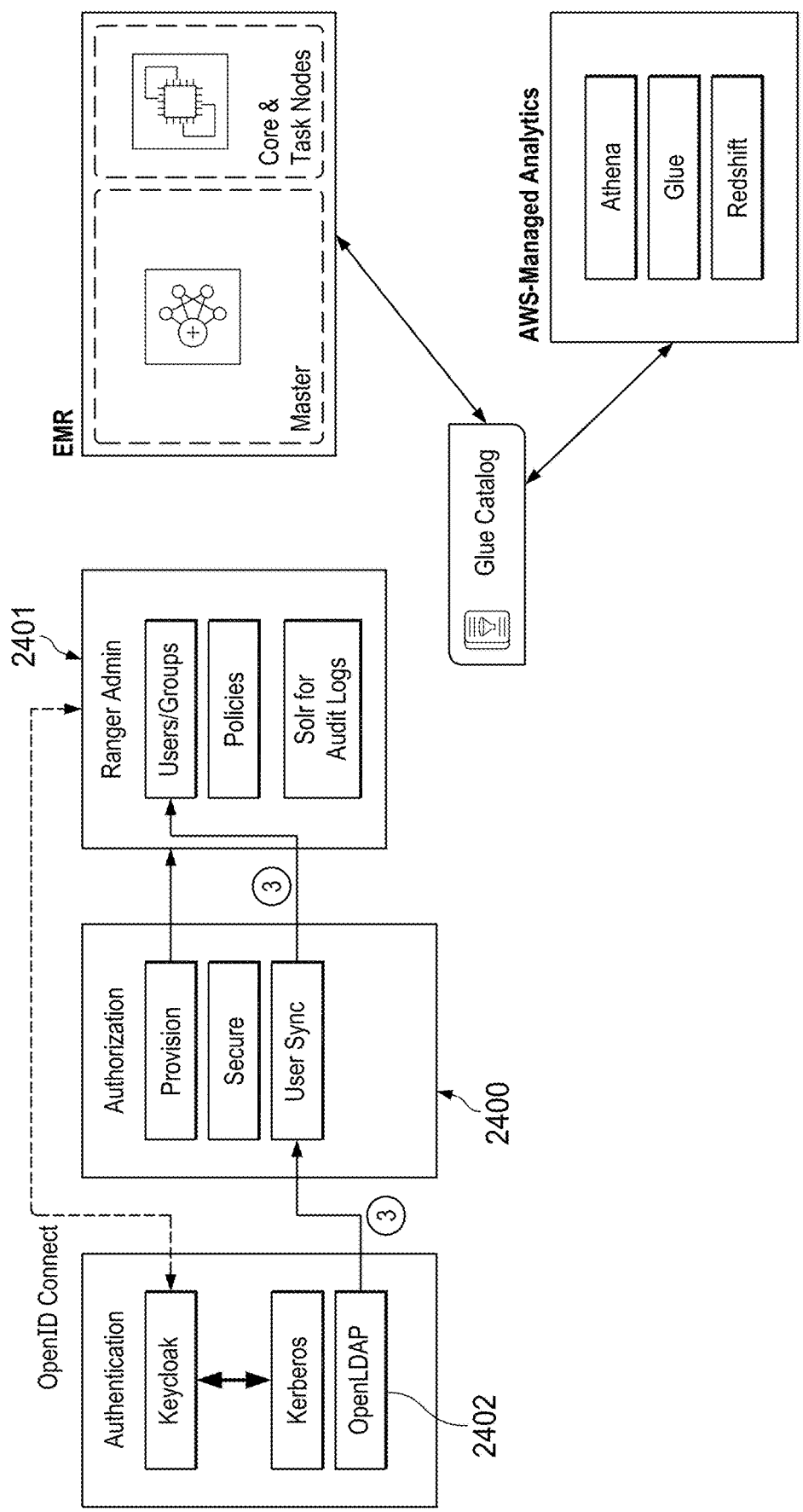
FIG. 24 depicts how the authorization framework facilitates interoperability to an associated authentication framework.

FIG. 24 depicts the authorization framework 2400 providing user and group synchronization between OpenLDAP 2402 to the Ranger Admin instance 2401. Preferably, a periodic user and group synchronization schedule is established so that users/groups from the authentication system (in OpenLDAP) are available in Ranger for policy assignments.

Figure 25:
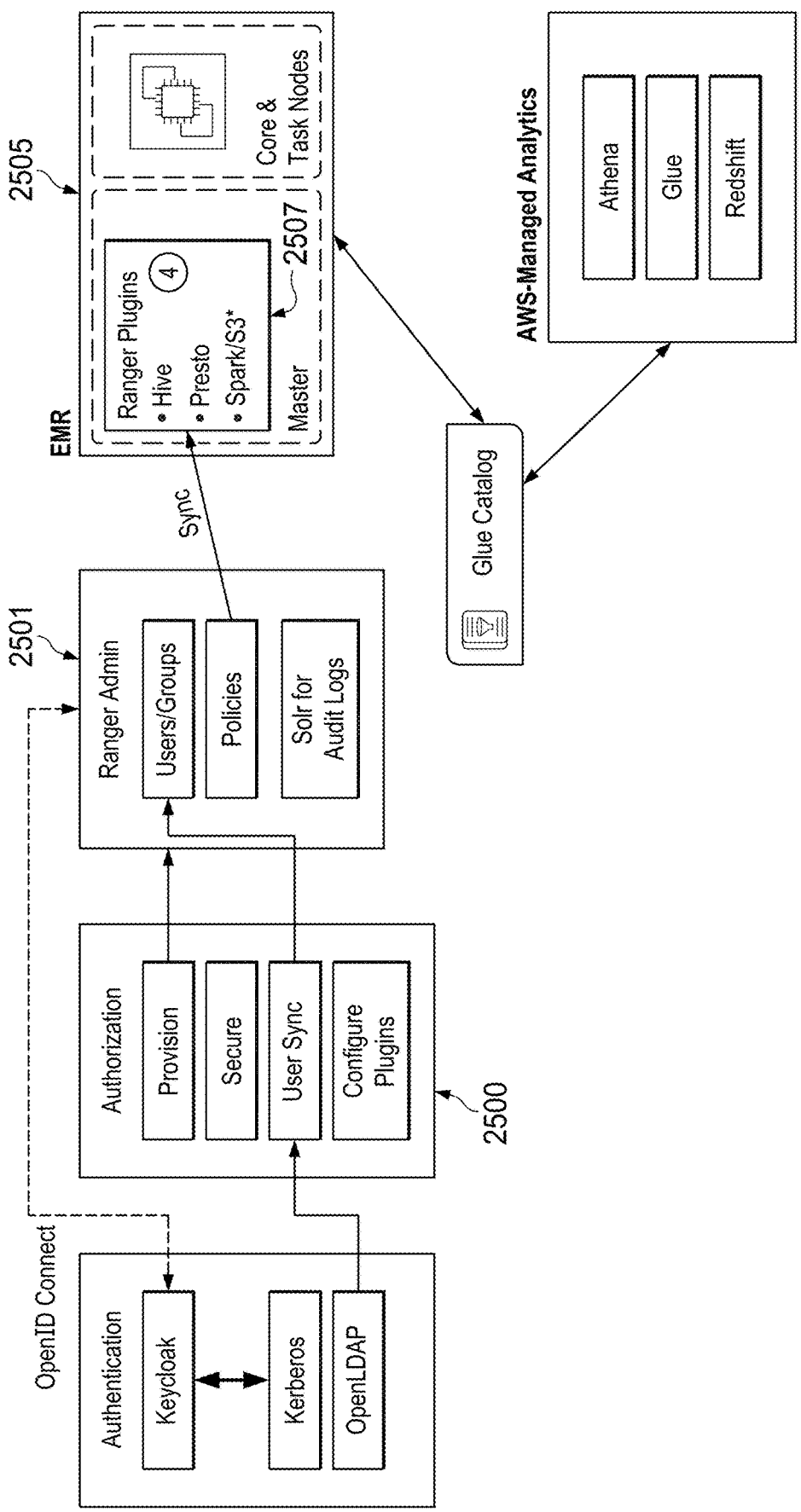
FIG. 25 depicts the authorization framework installing and configuring Ranger Admin plug-ins.

FIG. 25 depicts the authorization framework 2500 installing and configuring Ranger plug-ins 2507 on the EMR cluster 2505. In particular, Apache Ranger supports data access controls for multiple Hadoop applications, such as Hive, HDFS, Spark, Presto, Kafka, etc. Each such application requires a Ranger plugin to be installed on the cluster. During cluster provisioning, and as depicted, the authorization framework automatically installs and configures necessary Ranger plugins on the EMR cluster. In this manner, the Ranger plugins can contact the central Ranger Admin server 2501 as needed to synchronize any data access policies, and to enforce those data access policies when the users access the data lake.

As further background, AWS Lake Formation is a managed service that makes it easier to set up a curated and secure data lake. Among its various features, this service includes controlling access to datasets in the data lake, and auditing data access over time. Lake Formation natively integrates with other AWS data analytics services, such as Athena, Glue, Redshift Spectrum, and EMR Notebooks. Using the authorization framework herein, Lake Formation data access policies can be created in one central location and then applied across all these supported services uniformly.

Figure 26:
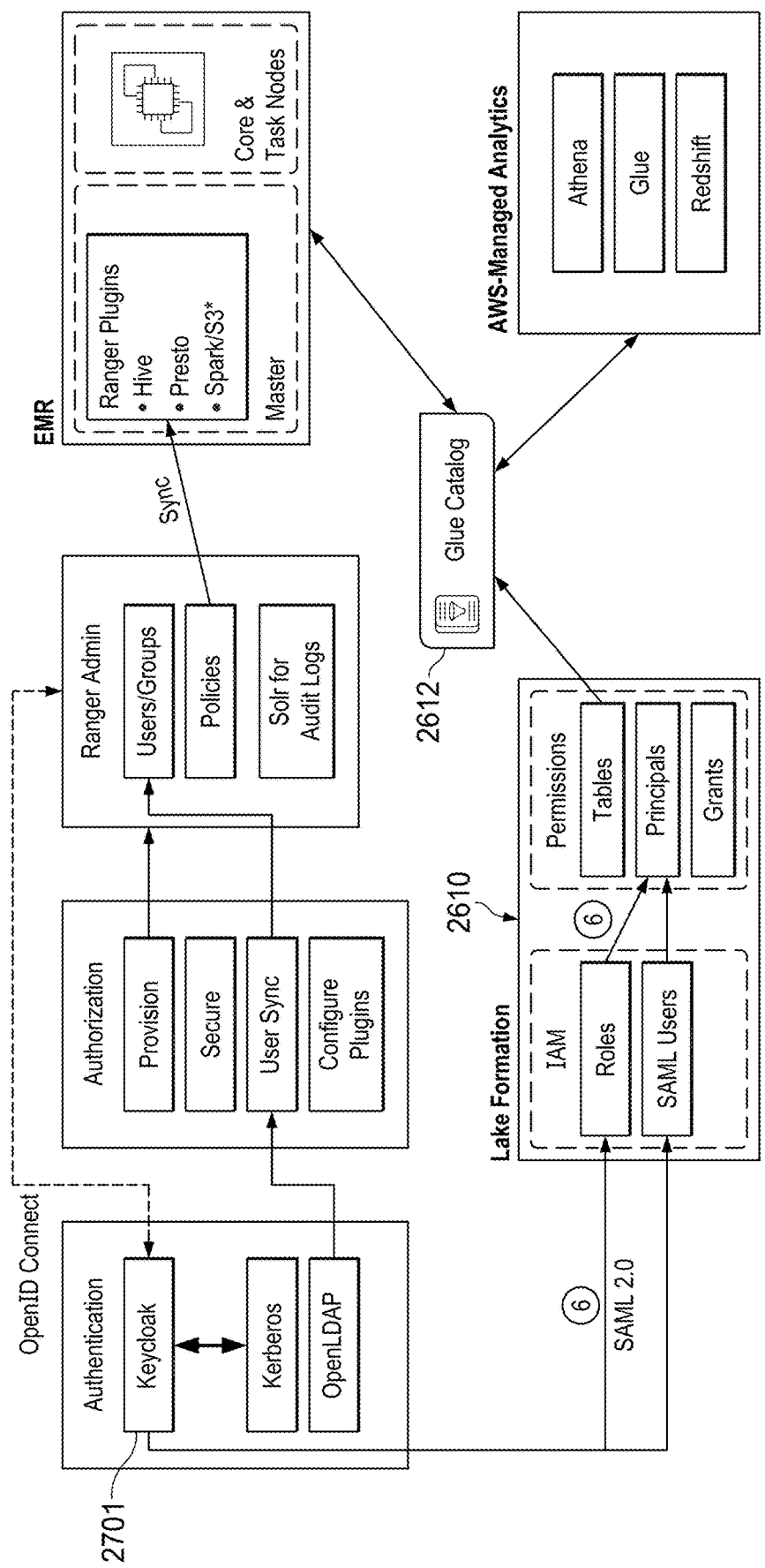
FIG. 26 depicts the authorization framework interoperation with AWS Lake Formation.

In particular, FIG. 26 depicts the authorization framework in association with Lake Formation 2610 and, in particular, configuring a data lake to use Lake Formation. This process continues on from the earlier-described and depicted operations. Preferably, an end-to-end orchestration process (such as described above) sets up a Lake Formation-enabled data lake at launch time, or an existing data lake can be configured to be managed by Lake Formation. Lake Formation continues to rely on the Glue Data Catalog 2612 for retrieving table/column metadata for all the datasets in the data lake.

Figure 27:
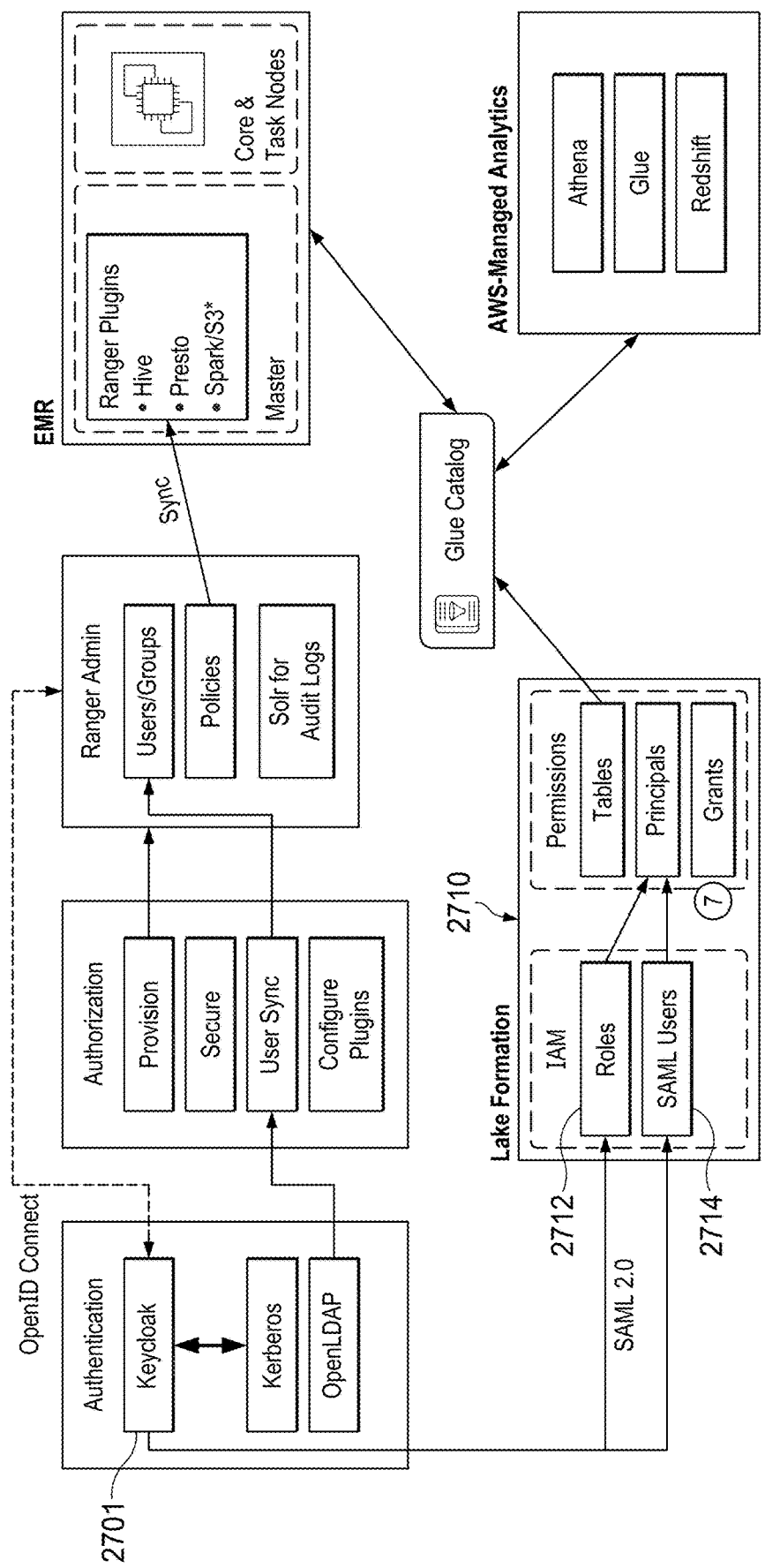
FIG. 27 depicts the authorization framework being used to facilitate user federation using SAML 2.0.

FIG. 27 depicts the authorization framework in association with a user federation using SAML 2.0. This approach enables the federation of roles and users from Keycloak 2701 using SAML 2.0. While setting up data access permissions, Lake Formation 2710 can use IAM roles 2712 and SAML users 2714 as principals. As described above, Keycloak (part of the integrated authentication framework) is a SAML 2.0 IDP, and it can federate the users' roles via SAML assertions, as depicted.

Figure 28:
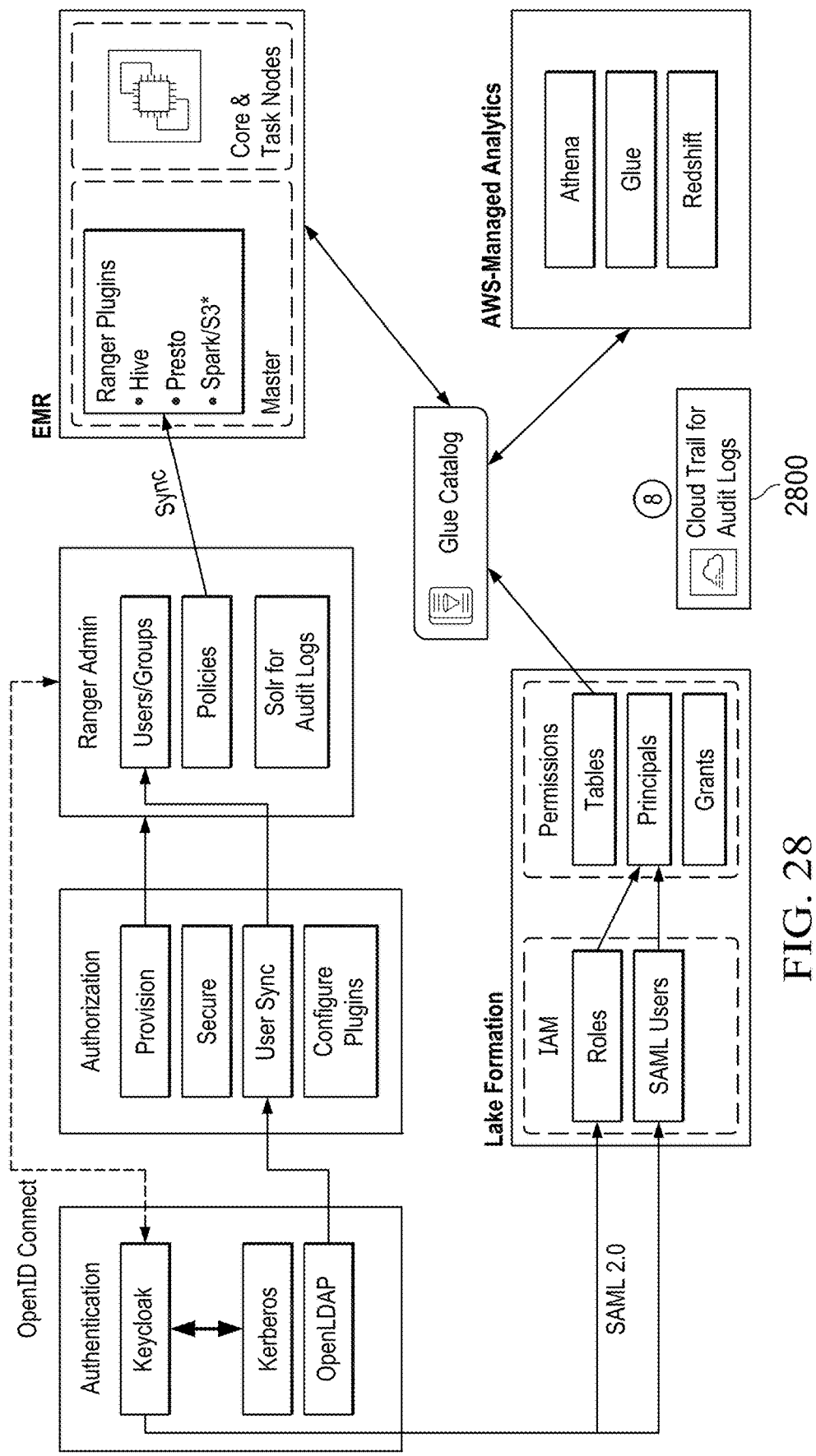
FIG. 28 depicts how the authorization framework interoperates with Lake Formation to facilitate granting or denying access to resources.

Lake Formation allows granular data access policies at a table or column level. These policies are then enforced by each supported processing engine such as Athena or Glue. FIG. 28 depicts this process. In this embodiment, a service such as AWS CloudTrail 2800 provides detailed access and deny logs for auditing purposes.

A feature of the above-described authorization framework is custom group mapping. Typically, users of the data lake want to use their own IDP (Identity Provider) such as Active Directory or Okta® for managing user groups. Similarly, many downstream applications provide fine-grained access controls using groups. To accomplish this, the following techniques are implemented. In particular, Keycloak is extended by adding a custom protocol mapper that extracts group information from a SAML assertion. Optionally, a prefix filter is applied to the group names, so that only groups relevant to the data lake are imported into Keycloak. Further, group membership deletions and updates preferably are also handled in the same way. Further, a group protocol mapper is applied to the service client in Keycloak so that this group information is passed onto downstream applications (e.g., like RStudio® Workbench™), which then apply their own fine-grained access control based on the user's group membership.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux®.

As noted above, the above-described SaaS orchestration functions may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed follows below:

1. A method, implemented by a service provider, in association with one or more cloud computing services, comprising:
    deploying a data lake by:
        provisioning, via automation, a private account within the one or more cloud computing services;
        provisioning, via automation, and in association with the private account, a logically-isolated virtual network of the one or more cloud computing services;
        provisioning, via automation, a firewall service; and
        provisioning, via automation, the data lake within the logically-isolated virtual network and in association with the firewall service, the data lake comprising a first service, and a second service, wherein the first and second services use different authentication mechanisms;
    provisioning, via automation, an authentication framework including an identity and access manager configured to enable a permitted user to use a single identity to access the logically-isolated virtual network of the one or more cloud computing services and the first and second services in the data lake;
    provisioning, via automation, an authorization framework in association with the authentication framework, the authorization framework configured following access to the logically-isolated virtual network of the one or more cloud computing services to apply authorization or data access rules to the single identity across the first and second services in the data lake;
    following deployment, and upon authenticating and authorizing the single identity by the authentication framework and the authorization framework, executing analytics on the data lake;
    wherein the operations are carried out in an automated manner in software executing on hardware.

2. The method as described in claim 1 wherein the identity and access manager is provisioned to support a Lightweight Directory Access Protocol, and a computer network security protocol.

3. The method as described in claim 2 wherein the first service is one of: a web application, an API endpoint, a cloud native web user interface, services that provide for distributed processing of data sets across computer clusters, cloud-native applications, and third-party applications.

4. The method as described in claim 3 wherein the second service is a service that is inaccessible via a web browser.

5. The method as described in claim 1 wherein the identity and access manager provides single sign-on using one of: OpenID Connect and SAML 2.0.

6. The method as described in claim 2 further including configuring a custom storage provider in association with the identity and access manager to support single sign-on that originates with a third party Identity Provider (IdP).

7. The method as described in claim 6 further including automatically federating one or more users associated with the third party IdP into the data lake.

8. The method as described in claim 2 wherein the identity and access manager is configured as a SAML 2.0 Identity Provider (IdP), and wherein the identity is a federated identity.

9. The method as described in claim 1 wherein the user accesses the data lake via an enterprise Identity Provider (IdP) that the identity and access manager is configured to trust.

10. The method as described in claim 1 wherein the authorization framework provides one of: a cloud-native authorization, enforcement of a policy associated with a service that provide for distributed processing of data sets across computer clusters, and enforcement of a cloud-native fine-grained policy.

11. The method as described in claim 1 wherein the authorization framework is one of: a data security framework, and a secure data lake provisioning service.

12. The method as described in claim 11 further including securing a login to the authorization framework using the authentication framework.

13. The method as described in claim 1 further including extending the identity and access manager to extract group information associated with an assertion, and to forward the extracted group information to an application that applies its own fine-grained access control based on group membership.

14. A software-as-a-service computing platform, comprising:
    computing hardware;
    computer software executing on the computer hardware, the computer software comprising program code executed on the computing hardware and configured in association with one or more cloud computing services to:
        deploy a data lake by:

provisioning a private account within the one or more cloud computing services;

provisioning, in association with the private account, a logically-isolated virtual network of the one or more cloud computing services;

provisioning a firewall service; and provisioning the data lake within the logically-isolated virtual network and in association with the firewall service, the data lake comprising a first service, and a second service, wherein the first and second services use different authentication mechanisms;

provision an authentication framework including an identity and access manager configured to enable a permitted user to use a single identity to access the logically-isolated virtual network of the one or more cloud computing services and the first and second services in the data lake;

provision an authorization framework in association with the authentication framework, the authorization framework configured following access to the logically-isolated virtual network of the one or more cloud computing services to apply authorization or data access rules to the single identity across the first and second services in the data lake; and following deployment of the data lake, and upon authenticating and authorizing the single identity by the authentication framework and the authorization framework, executing analytics on the data lake.

\* \* \* \* \*